United States Patent
Pütz et al.

(10) Patent No.: US 10,421,889 B2
(45) Date of Patent: Sep. 24, 2019

(54) PRESSURE-SENSITIVE ADHESIVES FOR BONDING FLEXIBLE PRINTING PLATES

(71) Applicant: tesa SE, Norderstedt (DE)

(72) Inventors: Benjamin Pütz, Hamburg (DE); Nils Thebud, Lüneburg (DE); Lisa Wieghardt, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 15/581,514

(22) Filed: Apr. 28, 2017

(65) Prior Publication Data

US 2017/0313915 A1 Nov. 2, 2017

(30) Foreign Application Priority Data

Apr. 29, 2016 (DE) .................... 10 2016 207 374

(51) Int. Cl.
*C09J 133/08* (2006.01)
*B41C 1/18* (2006.01)
(Continued)

(52) U.S. Cl.
CPC ............... *C09J 133/08* (2013.01); *B41C 1/18* (2013.01); *C09J 5/00* (2013.01); *C08L 33/08* (2013.01);
(Continued)

(58) Field of Classification Search
CPC ..................................................... C09J 133/08
See application file for complete search history.

(56) References Cited

U.S. PATENT DOCUMENTS

| 8,673,443 B2 | 3/2014 | Yokoyama et al. |
| 9,475,966 B2 | 10/2016 | Ellringmann et al. |

(Continued)

FOREIGN PATENT DOCUMENTS

| CN | 1958660 A | 5/2007 |
| CN | 10124756 A | 8/2007 |

(Continued)

OTHER PUBLICATIONS

NIIR Board of Consultants and Engineers: "Modern Technology of Printing & Writing Inks (with Formulae & Processes)" Dec. 31, 2015; Asia Pacific Business Press Inc.

(Continued)

*Primary Examiner* — Daniel H Lee

(74) *Attorney, Agent, or Firm* — Norris McLaughlin, P.A.

(57) ABSTRACT

A pressure-sensitive adhesive comprising at least 60 wt % of a polymer blend, where the polymer blend consists of a first polymer component A, a second polymer component B, and optionally one or more further polymer components (C, D, . . . ), where the first polymer component A is present at not less than x wt % in the polymer blend, where $90 \leq x \leq 99$, and where the second polymer component B and any further polymer components C, D, . . . present are present in total at y wt % in the polymer blend, where $y=100-x$, where each polymer component (A, B, C, . . . ) derives to an extent of at least 60 wt % from (meth)acrylic monomers, wherein none of the polymer components (A, B, C, . . . ) is homogeneously miscible at room temperature with any of the other polymer components (A, B, C, . . . ), and so a multi-phase system is present.

11 Claims, 3 Drawing Sheets

(51) Int. Cl.
*C09J 5/00* (2006.01)
*C08L 33/08* (2006.01)

(52) U.S. Cl.
CPC ....... *C08L 2207/02* (2013.01); *C08L 2312/00* (2013.01); *C09J 2201/606* (2013.01); *C09J 2203/10* (2013.01); *C09J 2433/00* (2013.01); *C09J 2467/006* (2013.01)

(56) References Cited

U.S. PATENT DOCUMENTS

| | | | |
|---|---|---|---|
| 9,845,414 | B2 | 12/2017 | Wieneke et al. |
| 2005/0064181 | A1* | 3/2005 | Blank ................. B41F 27/1275 428/354 |
| 2007/0196647 | A1 | 8/2007 | Yokoyama et al. |
| 2011/0166311 | A1 | 7/2011 | Ellringmann et al. |
| 2001/5175852 | | 6/2015 | Ellringmann et al. |
| 2015/0175852 | A1* | 6/2015 | Ellringmann ............ B41N 6/02 156/332 |
| 2016/0083629 | A1* | 3/2016 | Wang ..................... C09J 133/10 522/74 |
| 2016/0096980 | A1 | 4/2016 | Wieneke et al. |

FOREIGN PATENT DOCUMENTS

| | | |
|---|---|---|
| CN | 104540915 A | 4/2015 |
| CN | 105229103 A | 1/2016 |
| CN | 105247003 A | 1/2016 |
| EP | 0 760 389 A1 | 3/1997 |
| EP | 1 820 835 A1 | 8/2007 |
| EP | 2 226 372 A1 | 9/2010 |
| WO | 03/057497 A1 | 7/2003 |
| WO | 2014/001096 A1 | 1/2014 |

OTHER PUBLICATIONS

European Search Report from corresponding application 17166260.4 dated Aug. 8, 2017.
English translation of Chinese Search Report dated Nov. 14, 2018.

* cited by examiner

PRESSURE-SENSITIVE ADHESIVES FOR BONDING FLEXIBLE PRINTING PLATES

The present application claims priority of German Patent Application No. 10 2016 207 374.5, filed Apr. 29, 2016, the entire contents of which are hereby incorporated by reference herein.

The invention relates to a pressure-sensitive adhesive comprising at least 60 wt % of a polymer blend, where the polymer blend consists of a first polyacrylate-based polymer component A and at least one second polyacrylate-based polymer component B, and the first polymer component A is present at not less than x wt % in the polymer blend, where $90 \leq x \leq 99$, and where the second polymer component B and any further polymer components present are present in total at y wt % in the polymer blend, where $y=100-x$; and also to a production process for such a pressure-sensitive adhesive, and also to the use of such a pressure-sensitive adhesive for the bonding of printing plates, especially to printing cylinders and/or printing sleeves, and also to such use wherein the pressure-sensitive adhesive is provided in the form of an adhesive tape.

Within the printing industry a variety of techniques are known for transferring designs to paper or films, for example, by means of print originals. One possibility is that known as flexographic printing.

In the flexographic printing process, flexible printing plates are bonded to printing cylinders or printing sleeves. Such plates consist, for example, of a polyethylene terephthalate film (PET film) on which there is applied a photopolymer layer into which the appropriate print relief can be introduced by exposure of the print elements and subsequent washing-out of the non-print elements. The plate is then bonded to the printing cylinder or printing sleeve by way of the PET film. For the bonding, generally speaking, double-sided pressure-sensitive adhesive tapes are used, on which very stringent requirements are imposed. For the printing operation, the pressure-sensitive adhesive tape is required to have a certain hardness, but also a certain elasticity. These properties must be set very precisely in order that the printed image produced yields the desired outcome in accordance with the requirements. Stringent requirements are likewise imposed on the pressure-sensitive adhesive (PSA), since the bond strength ought likewise to be sufficient so that the printing plate does not detach from the double-sided pressure-sensitive adhesive tape, or the pressure-sensitive adhesive tape from the cylinder or sleeve. This must be so even at elevated temperatures—of 40 to 60° C., for example—and at relatively high printing speeds, and at temperatures lower than room temperature, such as at 15° C., for example. In addition to this property, however, the PSA must also possess reversible adhesion properties, to allow the printing plates to be detached again after the printing operations (in that situation, the adhesive bond between the pressure-sensitive adhesive tape and the printing cylinder or printing sleeve, and also the adhesive bond to the plate, must be able to be parted without residue, in order to ensure that both components can be used again). This detachability ought also to exist after bonding over a relatively long period (up to 6 months, for example). It is desirable, moreover, for it to be possible to remove the pressure-sensitive adhesive tape and especially the printing plate without destruction thereof, and also without great application of force, since in general the printing plates are used a number of times. Furthermore, there should be no residues on the printing plate and on the cylinder or sleeve.

In summary, therefore, very exacting requirements are imposed on the double-sided pressure-sensitive adhesive tapes suitable for this use.

Residue-free redetachability is a problem especially in the case of polar substrates such as steel, for example, since here it has been found that the bond strengths increase considerably over the course of time. For the purposes of the present specification, in relation to surfaces, the terms "polar" and "high-energy", i.e., having a high surface energy (SE), are equated, as are the terms "nonpolar" and "low-energy", since this simplifying model has become established in the art. The finding that lies behind this is that polar dipole forces are comparatively strong relative to what are called "disperse" or nonpolar interactions, which are built up without participation of permanent molecular dipoles. The basis for this model of interfacial energy and interfacial interactions is the idea that polar components interact only with polar components, and nonpolar components only with nonpolar components. This energy and its components are often measured by measurement of the static contact angles of different test liquids. The surface tensions of these liquids are assigned polar and nonpolar components. From the contact angles observed between the droplets and the test surface, the polar and nonpolar components of the surface energy for the test surface are ascertained. This can be done, for example, according to the OWKR model. One alternative method customary industrially is the determination using test inks according to DIN ISO 8296.

Examples of pressure-sensitive adhesives include those based on natural rubber, as documented by EP 760 389 A, for example. Also employed for the stated purpose, however, are pressure-sensitive adhesive tapes having polyacrylate-based PSAs. Accordingly, for example, WO 03/057497 A describes an acrylate PSA based on block copolymer for the stated application. WO 2004/067661 A discloses a pressure-sensitive adhesive tape with a PSA based on a soft acrylic monomer ($T_g<-20°$ C.) composed of at least 49.5 wt % of a hard, cyclic or linear (meth)acrylic ester monomer ($T_g>30°$ C.) and at least 10 wt % of functionalized hard (meth)acrylic acid/ester monomers ($T_g>30°$ C.), the PSA being produced in a two-stage method.

A further disadvantage of many PSAs known from the prior art for the adhesive bonding of printing plates is manifested especially when the bonded printing plates are to be cleaned to remove the printing ink. This is normally brought about by using solvents, for example solvents which also serve as solvents for the inks themselves, for washing and removing the inks from the plates. Relatively large quantities of solvent are often used here, which further exacerbates the problem. Inevitably in this procedure, there is creepage of solvent below the edges of the bond of the plate on the pressure-sensitive adhesive tape, and the edges of the adhesive tape on the printing cylinder or printing sleeve. This can entail detachment of the bond (of the plate to the adhesive tape and of the adhesive tape to the cylinder or sleeve), since the adhesives of the pressure-sensitive adhesive tape lose the necessary adhesion. The lifted edges ("flags") produced as a result of this lack of solvent resistance are then simultaneously printed in the process, as a result of which a flawed printed image (generally known as a misprint) is produced, if there are not, indeed, mechanical problems with the flags in the printing apparatus and hence system outages. In practice, therefore, the bonds on printing plates mounted with prior-art adhesives can advantageously be protected from the solvent by sealing of the respective edges with single-sided pressure-sensitive adhesive tapes or with liquid adhesives or hotmelt adhesives.

This additional sealing operation implies a significant extra expense, and the risk exists of damaging the expensive printing plates on demounting, particularly where liquid adhesives or hotmelt adhesives are used.

EP 2 226 372 A1 discloses an acrylate-based PSA for the bonding of printing plates to cylinders or sleeves that has a high acrylic acid fraction of between 8 and 15 wt %. Further monomers are linear and branched acrylic esters, and are present in a defined ratio to one another. Using such an adhesive, the requirements in terms of edge lifting behaviour and solvent resistance are met very well. PSAs with a high acrylic acid fraction, however, are prone to strong peel increase on polar substrates, such as steel, which is commonly the material for printing cylinders. Also being used increasingly are plastic sleeves, very often based on polyurethane. The adhesives on the printing sleeve side must adhere both to steel and to low-energy sleeve surfaces, and this poses an additional challenge in the development process. This problem also arises with the adhesive of EP 2 226 372 A1, particularly if it is used on the side of the adhesive tape facing the printing cylinder or printing sleeve. Demounting such adhesives from such substrates, therefore, entails problems; very high demounting forces arise, and the adhesive tape used may fracture, or residues remain on the substrate.

In order to provide a PSA which, even under the influence of solvents, ensures effective and reliable bonding to material common in flexographic printing, such as to PET (polyethylene terephthalate) in particular, but which nevertheless is still redetachable even after a prolonged time and even from highly polar substrates, such as the surfaces of steel printing cylinders or the surfaces of certain printing sleeves comprising polar plastic surfaces, where the PSA ought preferably to be suitable in particular for the reliable bonding of printing plates, and where, for an adhesive tape with the PSA, the stability of the adhesive tape assembly, particularly the reliable anchoring of the PSA on foam carriers—such as polyolefinic foams—is to be ensured, WO2014/001096 A1 discloses an acrylate-based PSA which comprises 2 to 20 wt % of an N-alkyl-substituted acrylamide and 5 to 25 wt % of a (meth)acrylic ester having a linear alkyl radical having at least 12 C atoms, and 0.5 to 5 wt % of (meth)acrylic acid.

While such PSAs do have properties that are an improvement on the prior art, it has nevertheless emerged that the adhesive bond between the printing plates and the PSAs, which are per se reversibly bonding, becomes primed by impurities in the solvents which the printing plates are cleaned after printing.

"Priming" in the area of adhesive tapes normally means that the bond strength to substrates can be increased by pretreating those substrates with suitable chemicals. In the present context, where an important part is played by the reversibility of the bonding, this priming is unwanted especially when it occurs unintentionally as a result of impurities. The "priming effect" in the present case is understood to mean that, as compared with printing plates cleaned with pure solvent, the adhesive strength of the PSA to the printing plates soiled by ink residues included in the solvents is significantly increased.

The impurities arise from ink residues from the printing inks in the solvents used for cleaning; even such small quantities of impurities that are not even visible are sufficient to bring about this effect. In this way, over time, significantly higher bond strengths are formed than is desirable for redetachment of the plates. In some cases the printing plates can be detached only with very high force application, as a result of which they may also be damaged, making it impossible for the plates to be used again. In order to avoid this, the printer is compelled to use fresh solvent and fresh cleaning cloths for each cleaning operation. Apart from the increased time and materials consumed in this case, it is hardly possible for this to be implemented in practice. Particularly because the soiling present is often not apparent to the eye, there is no acceptance among users for replacing solvents and cleaning cloths.

It is an object of the present invention, therefore, to provide a pressure-sensitive adhesive which in the bonding of printing plates, especially to printing cylinders and/or printing sleeves, counteracts the unwanted priming effect of the printing-ink residues in the solvents with which the printing plates are cleaned, and which therefore exhibits so-called "ink resistance", being insensitive to the influence of the printing-ink residues in the cleaning solvent. The bond strength of the PSA to surfaces soiled in this way may be equated with a physical anchoring whose cause may be attributed to at least one binder (also called film-former) present in printing inks. One binder, among others, commonly used in printing inks is cellulose nitrate (in common parlance "nitrocellulose"; for the purposes of this specification, the two terms are used synonymously), which is able to develop interaction with the PSA on the bond area and hence is known to cause this primer effect.

The object is achieved with a pressure-sensitive adhesive (PSA)—particularly for the bonding of printing plates, and especially to printing cylinders and/or printing sleeves— which comprises at least 60 wt % of a polymer blend, where the polymer blend consists of a first polymer component A, a second polymer component B, and optionally one or more further polymer components (C, D, . . . ), where the first polymer component A is present at not less than x wt % in the polymer blend, where 90≤x≤99, and where the second polymer component B and any further polymer components C, D, . . . present are present in total at y wt % in the polymer blend, where y=100−x, where each polymer component (A, B, C, . . . ) derives to an extent of at least 60 wt % from (meth)acrylic monomers, and wherein none of the polymer components (A, B, C, . . . ) is homogeneously miscible at room temperature with any of the other polymer components (A, B, C, . . . ), and so a multi-phase system is present.

Surprisingly it has emerged that a multi-phase configuration of the PSA of this kind, where one of the components is in a large excess in the defined quantity range, significantly reduces the resistance of the PSA to influences of printing-ink residues. This is manifested in a low value for the expenditure of force (increased as a result of the ink residues on the surface) required to detach a plate from the cylinder or the sleeve. More particularly, the force application is increased only slightly, preferably only unnoticeably, and more particularly not at all, relative to the force application needed for detachment with the same PSA without the influence of the printing-ink residues.

As well as the aforementioned requirement, the PSA of the invention ought preferably also to fulfil, as far as possible, the usual requirements which exist with the bonding of printing plates, including namely:

Assurance of effective and reliable bonding to material common in flexographic printing such as, in particular, to PET (polyethylene terephthalate), even under the influence of solvents Detachability even after prolonged time even from highly polar substrates such as, for example, the surfaces of steel printing cylinders or the surfaces of certain printing sleeves comprising polar plastic surfaces Suitability for reliable adhesive bonding of printing plates; for an adhesive tape featuring the PSA, the stability of the adhesive tape assembly, especially the reliable anchoring of the PSA on foam carriers such as polyolefinic foams and/or on film carriers is to be ensured.

This profile of requirements as well is met readily by the PSA of the invention.

BRIEF DESCRIPTION OF THE DRAWINGS

The invention will now be described in greater detail with reference to the drawings, wherein.

Figure 1A:
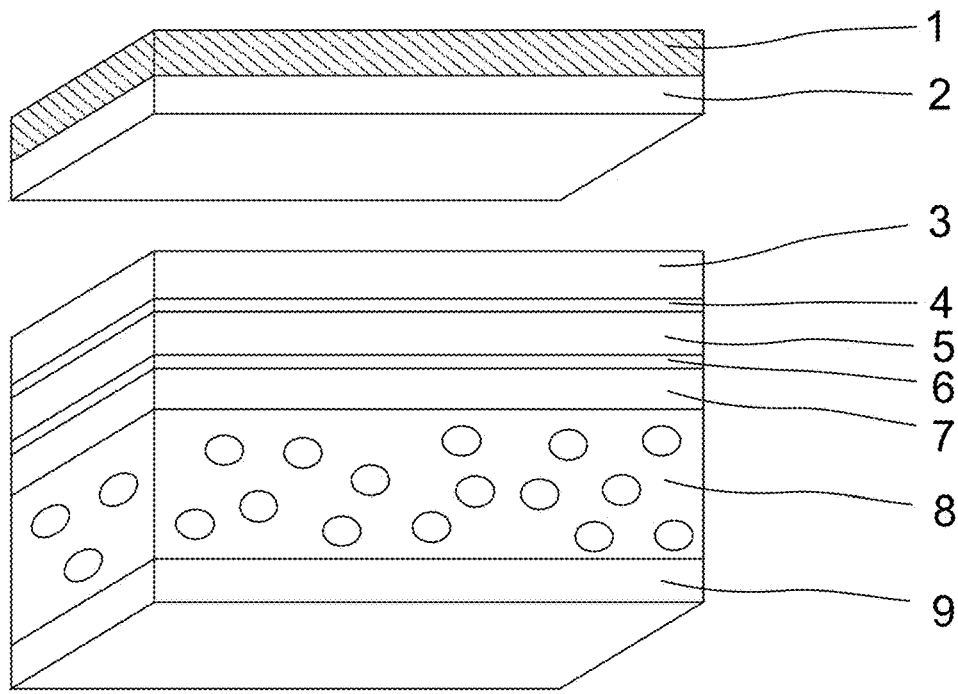
FIGS. 1a and 1b depict different constructs of an adhesive tape according to the present invention.

A polymer component in the context of this specification refers to an individual polymer or to a mixture of polymers which, however, are homogeneously miscible with one another, so that such a mixture forms a single, homogeneous phase. The parent polymers may be homopolymers (composed of a single kind of monomer) and/or copolymers (composed of more than one kind of monomer).

The polymers of the polymer components in this specification are polymers which derive to an extent of at least 60 wt % from (meth)acrylic monomers (regarding the definition of this term, see later on below). The polymer components A and/or B may advantageously—and independently of one another—comprise exclusively or partially those polymers which derive to an extent of at least 80 wt % from (meth)acrylic monomers; in one particular version, straight acrylate systems are used for the polymer components A and/or B, i.e. polymers which derive entirely—i.e. to an extent of 100 wt %—from (meth)acrylic monomers.

If further components C, D, etc. are present, then here as well—independently of the composition of components A and B, but especially if those components are also such systems—it is possible to use straight acrylate systems.

The term "pressure-sensitive adhesive" (PSA) refers, as is customary, to those viscoelastic, polymeric compositions which—optionally as a result of appropriate additization with further components, such as tackifier resins, for example—are durably tacky and permanently adhesive at the application temperature (room temperature, i.e., 23° C., unless otherwise defined) and adhere to a multiplicity of surfaces on contact, with adhesion more particularly being instantaneous (which exhibit what is called "tack" [also referred to as stickiness or touch-stickiness]). They are capable, even at the application temperature and without activation by solvent or by heat—but optionally under the influence of a more or less high pressure—of wetting a bond substrate sufficiently to allow interactions sufficient for adhesion to develop between the adhesive and the substrate.

PSAs consist customarily of a polymer component, also called base polymer component, which may be a homopolymer, a copolymer, or a mixture of polymers (homopolymers and/or copolymers), and optionally adjuvants (co-components, additives), sometimes to a considerable extent. The expressions "polymer (component) based on defined monomers", "polymer (component) based on a monomer mixture" or "polymer or polymer component deriving from defined monomers" means here, as is generally the usual case, that the polymer—or the polymers of the polymer component—can be obtained by polymerization—more particularly radical polymerization—of the corresponding monomers or of the corresponding monomer mixture.

PSAs can be produced in principle on the basis of polymers of different chemical types. The pressure-sensitive adhesion properties are influenced by factors including the nature and the proportions of the monomers employed—that is, the composition of the monomer mixture—in the polymerization of the polymers from which the PSA derives, the average molar mass and the molar mass distribution of the polymers, and optional admixing of adjuvants (type and amount).

In order for the viscoelastic properties to be obtained, the monomers which provide a basis for the PSA's parent polymers, and also any further components of the PSA that are present, are selected in particular such that the PSA has a glass transition temperature $T_g$ below the application temperature (usually, in other words, below room temperature). Beneath the glass transition temperature $T_g$, PSAs exhibit brittle-elastic (glasslike-amorphous or semicrystalline) behaviour; here it is not possible for pressure-sensitive adhesion behaviour to develop. Above the glass transition temperature $T_g$, the adhesives soften to a greater or lesser extent with increasing temperature, according to their composition, and, within a particular temperature range, adopt the viscosity values that are suitable for the pressure-sensitive adhesion properties, before, at even higher temperatures, becoming too highly mobile still to possess pressure-sensitive adhesion properties (unless they undergo decomposition beforehand).

Glass transition temperatures are cited as the result of measurements by differential scanning calorimetry DSC according to DIN 53 765, particularly sections 7.1 and 8.1, but with uniform heating and cooling rates of 10 K/min in all heating and cooling steps (cf. DIN 53 765, section 7.1, note 1). The initial sample mass is 20 mg. The PSA is pretreated (cf. section 7.1, first run). Temperature limits: −140° C. (instead of $T_g$−50° C.)/+200° C. (instead of $T_g$+50° C.). The reported glass transition temperature $T_g$ is the sample temperature in the heating operation of the second run at which half of the change in specific heat capacity has been reached.

The glass transition temperatures, as a characteristic feature of the monomers used, are specified in relation to the respective homopolymer of each of the monomers, obtainable according to the synthesis protocol for acrylate PSAs, in the experimental section, using 400 g of the respective monomers rather than the monomer mixture. The $T_g$ is determined after removal of the solvent, in the noncrosslinked state (in the absence of crosslinkers).

In particular the PSA of the invention is in phase-separated form, and so the PSA of the invention is at least microscopically and at least at room temperature—defined at 23° C.—preferably in at least two-phase form, optionally in multi-phase morphology, so that at least two or more stable phases are formed which are each present homogeneously per se.

The polymer components present in the PSA are preferably selected such that at 23° C. they are not miscible with one another to the point of homogeneity. With particular preference the polymer components are not homogeneously miscible with one another at least in a temperature range from 0° C. to 50° C., more particularly from −30° C. to 80° C., so that in these temperature ranges the PSA at least microscopically is in at least two-phase form.

Components are defined in the sense of this specification as being "not homogeneously miscible with one another", when even after intimate mixing, the formation of at least two stable phases can be detected physically and/or chemically, at least microscopically, with one phase being rich in one component and a second phase being rich in the other component. The presence of negligibly small amounts of one component in the other, not opposing the development of a multi-phase system, is considered immaterial in this context. Thus, for example, in the phase of the first polymer component A there may be small amounts of the second polymer component B, provided that the amounts involved are not substantial amounts influencing the phase separation; corresponding comments apply to small amounts of the polymer component A in the polymer component B, and also, in each case, to the other polymer components present in the PSA.

The phase separation may in particular be such that discrete regions ("domains") which are rich in one of the polymer components—for instance the first polymer component A—and which are therefore essentially formed of the corresponding polymer component, are present in a continuous matrix which is rich in another polymer component—for instance, the second polymer component B—being therefore formed essentially of the polymer component B. Where there are further polymer components C, D, ... in the PSAs, they are, in one particularly preferred version of the invention, likewise present in the form of discrete regions ("domains") in the matrix formed by the polymer component A, independently of the domains of the polymer component B and also independently of domains of any further polymer components present, thus giving a multi-phase system with more than two phases—specifically in the number of components which are not homogeneously miscible with one another.

A suitable system for analysing a phase separation is, for example, scanning electron microscopy. Phase separation may alternatively be evidenced, for example, by the different phases having two glass transition temperatures independent of one another in differential scanning calorimetry (DSC). Phase separation is present in accordance with the invention when it can be demonstrated unambiguously by at least one of the analytical methods.

Phase separation between two polymer components can be realized with particular advantage when the Hansen solubility parameters of the polymer components differ sufficiently from one another, expressed by the dissimilarity "Z". It has emerged that in this case the PSAs are particularly ink-resistant.

One description of solubility parameters known in the literature is that which uses the one-dimensional Hildebrand parameter ($\delta$). These one-dimensional $\delta$ values, however, carry errors, which are usually large in the case of polar compounds, such as acrylates, or those which are able to form hydrogen bonds, such as acrylic acid, for example. Because the model of the one-dimensional Hildebrand solubility parameters therefore finds only limited application, it was developed further by Hansen (Hansen Solubility Parameters: A User's Handbook, Second Edition; Charles M. Hansen; 2007 CRC Press; ISBN 9780849372483).

The Hansen solubility parameters which are therefore widely used nowadays are three-dimensional solubility parameters. They consist of a disperse portion ($\delta_d$), a portion comprising polar interactions ($\delta_p$) and a portion for the hydrogen bonds ($\delta_H$). Their relationship with the Hildebrand parameter $\delta$ is as follows:

$$\delta^2 = \delta_d^2 + \delta_p^2 + \delta_H^2$$

$\delta_d$, $\delta_p$ and $\delta_H$ cannot be determined directly for polyacrylates by experimental means, but can be calculated via incremental systems. A common method, and one also employed in this specification, is that of Stefanis/Panayiotou (Prediction of Hansen Solubility Parameters with a New Group-Contribution Method; Int. J. Thermophys. (2008) 29:568-585; Emmanuel Stefanis, Costas Panayiotou):

For determining the Hansen solubility parameters for the polyacrylates, those solubility parameters of the units in the polymers that derive from the individual monomers, in other words those of the repeating unit in a polymer chain (without the polymerizable double bond, instead a covalent sigma bond as present in the polymer chain), are calculated in accordance with the protocol in the stated publication. For each group in the unit there is a particular value tabulated for the disperse portion ($\delta_d$), the polar interactions ($\delta_p$) and the hydrogen bonding portion ($\delta_H$); see Prediction of Hansen Solubility Parameters with a New Group-Contribution Method; Int. J. Thermophys. (2008), Tables 3 to 6, pages 578 to 582.

EXAMPLES

Polyacrylic Acid Contains the Repeating Unit

according to the incremental system of Stefanis/Panayiotou, the Hansen solubility parameters (one $CH_2$ group, one CH group and one COOH group) for the unit in question come out as being $\delta_d$=17.7, $\delta_p$=8.6 and $\delta_H$=11.1.

Polybutyl Acrylate Contains the Repeating Unit

with four $CH_2$ groups, one CH group, one COO group and one $CH_3$ group, the Hansen solubility parameters for the unit in question come out as being $\delta_d$=17.1, $\delta_p$=8.6 and $\delta_H$=6.5.

After the calculation of the Hansen solubility parameters for the monomer units, the corresponding Hansen solubility parameters of the polyacrylates (copolymers) can be determined. The solubility parameters ($\delta_D$, $\delta_P$, $\delta_H$) for acrylate copolymers are determined from the molar fraction of the individual monomers (units) of which the polyacrylate is composed, the respective values being multiplied by the molar fraction of the monomer unit in the copolymer, after which the fractional parameters ($\delta_d$, $\delta_p$, $\delta_H$ for each monomer) are added up.

This may be illustrated using, as an example, a polyacrylate consisting of 97 wt % butyl acrylate and 3 wt % acrylic acid, corresponding to a molar composition of 84.8 mol % butyl acrylate and 5.2 mol % acrylic acid.

|  | $\delta_d$ | $\delta_p$ | $\delta_H$ |
|---|---|---|---|
| Butyl acrylate ($\delta_d$ = 17.1, $\delta_p$ = 8.6 and $\delta_H$ = 6.5) | 0.848 × 17.1 = 16.2 | 0.848 × 8.6 = 8.2 | 0.848 × 6.5 = 6.1 |
| Acrylic acid ($\delta_d$ = 17.7, $\delta_p$ = 8.6 and $\delta_H$ = 11.1) | 0.052 × 17.7 = 0.9 | 0.052 × 8.6 = 0.4 | 0.052 × 11.1 = 0.6 |
| + |  |  |  |
| Polyacrylate | 17.1 | 8.6 | 6.7 |

For homogeneously miscible polymer mixtures, a corresponding approach is taken: the Hansen solubility parameters of a respective polymer are multiplied in each case by the molar fraction of this polymer in the polymer component, and the proportional values are then added up in order to arrive at the respective parameter for the polymer component.

The dissimilarity of two polymer components 1 and 2 (for example, polymer components A and B) is expressed in this specification by the parameter Z.

The parameters $\delta_{d1}$, $\delta_{p1}$ and $\delta_{H1}$ of polymer component 1 are each subtracted from the corresponding parameters $\delta_{d2}$, $\delta_{p2}$ and $\delta_{H2}$ of polymer component 2. The absolute amount is determined from the respective differential values, and this amount is added up in each case to form the overall factor Z:

$$Z=|\delta_{d1}-\delta_{d2}|+|\delta_{p1}-\delta_{p2}|+|\delta_{H1}-\delta_{H2}|$$

The Hansen solubility parameters of each of the series of monomers very suitable in accordance with the invention are listed in the appended Table 3, and so the above values for polymer components with polymers formed from them can easily be determined.

PSAs particularly preferred in accordance with the invention are notable in that the dissimilarities Z of all the components to one another adopt a value of more than 1 in each case.

A further aspect of the invention relates, therefore, to a pressure-sensitive adhesive (PSA) which—considered first of all independently of the issue of phase separation—comprises at least 60 wt % (based on the PSA) of a polymer blend, where the polymer blend consists of a first polymer component A, a second polymer component B and optionally one or more further polymer components (C, D, . . . ), where the first polymer component A is present at not less than x wt % (based on the polymer blend) in the polymer blend, where 90≤x≤99, and where the second polymer component B and any further polymer components C, D, . . . present are present in total at y wt % (based on the polymer blend) in the polymer blend, where y=100−x, where each polymer component (A, B, C, . . . ) derives to an extent of least 60 wt % from (meth)acrylic monomers, and where the dissimilarity Z of the Hansen solubility parameters of each of the polymer components A, B, C, . . . with each of the other polymer components A, B, C . . . adopts a value of at least 1.

With particular preference in accordance with the invention, as a consequence of the dissimilarities chosen, it is the case that none of the polymer components (A, B, C, . . . ) is homogeneously miscible at room temperature with any of the other polymer components (A, B, C, . . . ), and so a multi-phase system is present.

DETAILED DESCRIPTION OF THE INVENTION

Composition of the Polymer Blend

The PSA of the invention comprises a polymer blend having at least two polymer components—that is, a first polymer component A and a second polymer component B—which are each obtainable from one or more polymers by conventionally known polymerization processes—such as, for instance, free radical polymerization or controlled radical polymerization. In principle the monomers for preparing the polymers of components A and B—and also of any further polymer components C, D, . . . present—may be selected from the same monomer pool, with the proviso that the selection is made such that the components are not homogeneously miscible with one another at room temperature.

The polymers of the polymer components A, B, C, . . . are more particularly polyacrylate-based polymers, in other words polymers which at least predominantly—more particularly to an extent of more than 60 wt %—derive from acrylic esters and/or methacrylic esters, and also, optionally, the associated free acids, as monomers (referred to below as "acrylic monomers"). Polyacrylates are preferably obtainable by free radical polymerization. Polyacrylates may optionally comprise further units based on other, non-acrylic, copolymerizable monomers.

The polyacrylates can be homopolymers and/or, in particular, copolymers. The term "copolymer" for the purposes of this invention encompasses not only those copolymers in which the comonomers used in the polymerization are incorporated purely statistically, but also those in which there are gradients in the comonomer composition and/or local accumulations of individual kinds of comonomer, and also entire blocks of one monomer, in the polymer chains. Alternating comonomer sequences are also conceivable.

The polyacrylates may for example be linear, branched, star-shaped or grafted in structure, and may be homopolymers or copolymers.

Advantageously the average molar mass (weight average $M_W$) of at least one of the polyacrylates of the polyacrylate-based polymer, advantageously of the predominant part by weight of the polyacrylates when there are two or more polyacrylates present, and more particularly of all poylacrylates present, is in the range from 250 000 g/mol to 10 000 000 g/mol, preferably in the range from 500 000 g/mol to 5 000 000 g/mol.

With particular preference the composition of the polyacrylate component is selected such that the polyacrylate component has a glass transition temperature (DSC; see below) of not more than 0° C., preferably of not more than −20° C., very preferably of not more than −40° C.

The glass transition temperature of copolymers may advantageously be selected, through the choice and proportional composition of the components used, in such a way that in analogy to the Fox equation according to equation E1

$$\frac{1}{T_g} = \sum_n \frac{w_n}{T_{g,n}} \tag{E1}$$

a suitable glass transition point $T_g$ for the polymer is obtained; where
n=serial number of the monomers used, $w_n$=mass fraction of the respective monomer n (wt %), and $T_{g,n}$=respective glass transition temperature of the homopolymer of the respective monomer n in K. Up to a particular upper limiting molar mass, glass transition temperatures of homopolymers may be dependent on the molar mass of the homopolymer; the reference to glass transition temperatures of homopolymers in this specification is made with reference to those polymers whose molar masses lie above this limiting molar mass, in other words in the glass transition temperature-constant range. Determining the $T_g$ is done after removal of the solvent, in the non-crosslinked state (in the absence of crosslinkers).

Equation E1 may also be employed analogously for determining and predicting the glass transition temperature of polymer mixtures. In that case, where the mixtures are homogeneous,
n=serial number of the polymers used, $w_n$=mass fraction of the respective polymer n (wt %) and $T_g$,n=respective glass transition temperature of the polymer n in K. Blending with tackifier resins generally raises the static glass transition temperature. Statistical copolymers can be used with particular advantage for the purposes of this invention. At least one kind of polymer in the polyacrylate component is based advantageously on unfunctionalized α,β-unsaturated esters. Where this kind of polymer is used for the at least one polymer in the polyacrylate component with copolymer character, monomers employed in preparing this at least one kind of polymer may in principle be all compounds familiar to the skilled person that are suitable for the synthesis of (meth)acrylate (co)polymers. Use is preferably made of α,β-unsaturated alkyl esters of the general structure

where $R^1$=H or $CH_3$ and $R^2$=H or linear, branched or cyclic, saturated or unsaturated alkyl radicals having 1 to 30, more particularly having 4 to 18, carbon atoms.

At least one kind of monomer for the polyacrylates of the polyacrylate component in the advantageous adhesive of the invention are those whose homopolymer has a glass transition temperature $T_g$ of not more than 0° C., very preferably at most −20° C. These are, in particular, esters of acrylic acid with linear alcohols having up to 10 C atoms or with branched alcohols having at least 4 C atoms, and esters of methacrylic acid with linear alcohols having 8 to 10 C atoms or with branched alcohols having at least 10 C atoms. Additionally, moreover, monomers may be employed whose homopolymer has a glass transition temperature $T_g$ of more than 0° C. Specific examples according to the invention are preferably one or more members selected from the group encompassing:

methyl acrylate, methyl methacrylate, ethyl acrylate, n-propyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, n-nonyl methacrylate, n-decyl acrylate, n-decyl methacrylate, isobutyl acrylate, isopentyl acrylate, isooctyl acrylate, isooctyl methacrylate, the branched isomers of the aforementioned compounds, such as, for example, 2-ethylhexyl acrylate, 2-ethylhexyl methacrylate, 2-propylheptyl acrylate.

Moreover, monomers may be selected which have a tendency to form semicrystalline regions in the polymer. This behaviour is found for acrylic esters and methacrylic esters with a linear alkyl radical having at least 12 C atoms in the alcohol residue, preferably at least 14 C atoms in the alcohol residue. Here it is possible with particular advantage in accordance with the invention to use, for example, stearyl acrylate and/or stearyl methacrylate.

Other monomers which can be used with advantage are monofunctional acrylates and/or methacrylates of bridged cycloalkyl alcohols having at least 6 C atoms in the cycloalkyl alcohol residue. The cycloalkyl alcohols may also be substituted, by for example $C_1$ to $C_6$ alkyl groups, halogen atoms or cyano groups. Specific examples are cyclohexyl methacrylates, isobornyl acrylate, isobornyl methacrylate and 3,5-dimethyladamantyl acrylate.

For varying the glass transition temperature it is possible, for preparing the polyacrylates, also to make use in part of those comonomers whose homopolymers possess a high static glass transition temperature. Suitable components are aromatic vinyl compounds, such as styrene, where preferably the aromatic rings comprise $C_4$ to $C_{18}$ units and may also contain heteroatoms. Particularly preferred examples are 4-vinylpyridine, N-vinylphthalimide, methylstyrene, 3,4-dimethoxystyrene, 4-vinylbenzoic acid, benzyl acrylate, benzyl methacrylate, phenyl acrylate, phenyl methacrylate, tert-butylphenyl acrylate, tert-butylphenyl methacrylate, 4-biphenylyl acrylate and methacrylate, 2-naphthyl acrylate and methacrylate, and mixtures of those monomers, this enumeration not being exhaustive.

As comonomers to the acrylic monomers it is also possible to use other monomers which can be copolymerized with acrylic monomers, in a fraction of up to 40 wt %, for example. Such comonomers may in principle be all compounds compatible with the acrylates and having copolymerizable double bonds, such as vinyl compounds, for instance. Such vinyl compounds may be wholly or partly selected from the group encompassing vinyl esters, vinyl ethers, vinyl halides, vinylidene halides, vinyl compounds with aromatic rings and heterocycles, especially in α-position to the double bond. Comonomers suitable with particular preference are, for example, vinyl acetate, vinylformamide, vinylpyridine, ethyl vinyl ether, vinyl chloride, vinylidene chloride, acrylonitrile.

However, other compounds copolymerizable with acrylic monomers can also be used here.

For effective crosslinking it is especially advantageous if at least some of the polyacrylates have functional groups with which the inventively employed crosslinkers are able to react. For this purpose, preference is given to using monomers having acid groups, such as acrylic acid, sulfonic acid or phosphonic acid groups, for example, or having acid anhydride units.

Particularly preferred examples of monomers for polyacrylates are acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, maleic anhydride.

Crosslinkinq

Another criterion for suitability as a PSA is that of cohesion. The polymer adhesive must typically have sufficient cohesion to allow the adhesion to be mediated on adhesive bonding, and not to flow from the bondline. By means of suitable cohesion-enhancing measures, such as crosslinking reactions (formation of bridge-forming links between the macromolecules), for example, it is possible to adjust, enlarge and/or shift the temperature range within which a polymer adhesive has pressure-sensitive adhesion properties. The range for application of the PSAs can therefore be optimized by making an adjustment between fluidity and cohesion of the adhesive.

With particular preference the procedure adopted in accordance with the invention is that at least the matrix component—formed in particular by the first polymer component A—is crosslinked. The domains of the other polymer components—particularly of the second polymer component B, and optionally also of any further polymer components present—may likewise be crosslinked, but may also be non-crosslinked, in each case independently of the crosslinking status of the other polymer components present.

In order to obtain the optimum properties of the PSA of the invention, it ought very preferably to be crosslinked. As already set out above, it is advantageous if at least the matrix polymer component is crosslinked; alternatively or additionally, however, the other polymer components (present as domains) may also be crosslinked, in each case independently of any further polymer components present.

The PSA of the invention is especially suitable for use for the bonding of printing plates to printing cylinders and printing sleeves, particularly as a layer of adhesive of an adhesive tape on the side facing the printing cylinder or sleeve (i.e., in contact with these substrates on bonding) when its micro-shear travel, in relation to the shearing in 15 min at 40° C. of a sheet section of the applied PSA initially measuring 13 mm×10 mm with a thickness corresponding to a basis weight of 50 g/m² under a load of 1.0 N in the direction of the greater longitudinal extent in accordance with method F, is between 100 μm and 300 μm. The best properties for the adhesive of the invention are obtained for a state of crosslinking corresponding to a micro-shear travel, in relation to the reference indicated above, of between 125 μm and 250 μm.

The aforementioned values can be effectively set by using a suitable crosslinker in a well-defined amount, more particularly in the case of a crosslinking reaction which almost completely runs its course.

Through addition of suitable thermal crosslinkers, the PSA of the invention advantageously has thermal crosslinkability, and therefore does not require the addition of actinically activatable crosslinkers, such as crosslinkers activatable by ultraviolet light (UV crosslinkers), for example. Thermal crosslinking may be carried out under conditions which are substantially milder for the PSA, since it does not require exposure to the radiation, which also has a destructive effect.

If desired in a particular case, however, it is also possible to bring about crosslinking exclusively or additionally by exposure to actinic radiation, in which case any crosslinker substances useful or required may be added (e.g. UV crosslinkers).

Generally speaking, therefore, the PSA of the invention comprises thermal crosslinkers, these being substances which permit (initiate) and/or promote a crosslinking reaction under the influence of thermal energy.

Adjusting the state of crosslinking—particularly to the preferred ranges specified above—may be done, for example, by the use of covalently reacting crosslinkers, more particularly epoxides, isocyanates and/or aziridines, and/or through the use of coordinative crosslinkers, more particularly metal chelates, preferably aluminium chelate.

Metal chelates, such as aluminium chelates in particular, in the form of aluminium(III) acetylacetonate, for example, are used for achieving the above-specified state of crosslinking preferably in an amount of 0.15 to 0.35 part by weight, more preferably of 0.2 to 0.3 part by weight, based in each case on 100 parts by weight of the polymer component (solvent-free).

Examples of other very suitable thermal crosslinkers are epoxides containing tertiary amine functions, such as, in particular, tetraglycidyl-meta-xylenediamine (N,N,N',N'-tetrakis(oxiranylmethyl)-1,3-benzenedimethanamine). These compounds are used preferably in an amount of 0.03 to 0.1 part by weight, more preferably of 0.04 to 0.07 part by weight, for example 0.06 part by weight, in turn based in each case on 100 parts by weight of the polymer component (solvent-free), in order to achieve the state of crosslinking defined above.

Crosslinking advantageously takes place such that the crosslinking reaction as far as possible runs its entire course. For this purpose it is useful if at least 85 wt %, preferably at least 90 wt %, of the crosslinker is converted during the crosslinking reaction. At such a conversion of the crosslinking reaction, it has been possible in each case to realize the above-defined state of crosslinking of the PSA.

In one advantageous procedure, a crosslinked PSA is prepared by first using radical polymerizations to prepare the polymers of the respective polymer components from the monomer mixtures from which they derive correspondingly. These polymer components are then intimately mixed. During, or preferably after the polymerization, at least one thermal crosslinker, more particularly one or more of the crosslinkers set out above, very preferably aluminium(III) acetylacetonate or tetraglycidyl-meta-xylendiamine, more particularly in the respective amounts specified above, are added. If—as set out below for the PSA of the invention, but generally not necessary—further additives are to be added, they are likewise admixed.

The PSA mixed with the crosslinker is crosslinked, by supply of thermal energy, to an extent such that its state of crosslinking corresponds to a micro-shear travel in the range from 100 μm to 300 μm, preferably in the range from 125 μm to 250 μm (for reference see above).

Advantageous Embodiments of the Invention

In a particularly preferred embodiment of the invention, the polymer blend is formed exclusively of the polymer components A and B, thus giving a two-phase system.

The first polymer component A may be formed by a single polymer, which may be a homopolymer or else a copolymer, polymerized more particularly from the monomers identified in this specification.

Alternatively the first polymer component A may be a homogeneous mixture of two or more polymers, hence consisting of a plurality of polymers miscible with one another, each of which independently of one another may be homo- or copolymers. One, some or, preferably, all of these polymers are advantageously derived from the monomers specified in this text.

The second polymer component B may be formed by a single polymer, which may be a homopolymer or else a copolymer, polymerized more particularly from the monomers identified in this specification.

Alternatively the second polymer component B may be a homogeneous mixture of two or more polymers, hence consisting of a plurality of polymers miscible with one another, each of which independently of one another may be homo- or copolymers. One, some or, preferably, all of these polymers are advantageously derived from the monomers specified in this text.

In one particular embodiment of the invention, the first polymer component A and the second polymer component B are each formed by a single, acrylate-based copolymer, the composition of said copolymers more particularly being such that they fulfil the stipulations according to the invention for the PSA.

In another particular embodiment of the invention, the first polymer component A represents a homogeneous mixture of two or more acrylate-based copolymers, while the second polymer component B is formed by a single acrylate-based copolymer. The compositions of the polymer components are more particularly such that they fulfil the stipulations according to the invention for the PSA.

Any further polymer components present as well, C, D, . . . , may, independently of one another, each be realized by a single homo- or copolymer or by a homogeneous polymer mixture. The statements above for the second polymer component B apply correspondingly in each case.

Admixtures

In a preferred way, the polymer component as such—without substantial fractions of other constituents—is already pressure-sensitively adhesive. In accordance with the invention the polymer blend accounts for at least 60 wt % of the PSA.

In a preferred procedure, the polymer blend makes up at least 98 wt %, more preferably more than 99.9 wt %, of the composition of the PSA, minus the crosslinker present (i.e. based on all constituents of the PSA except for the crosslinker or crosslinkers, since the latter is customarily present and ought therefore to be disregarded with regard to the freedom from additive). Very preferably a figure of 100 wt % is selected (notwithstanding the presence of crosslinkers; as described immediately above).

As a concomitant of their production, however, PSAs typically comprise a small fraction of impurities, unconverted monomers or the like.

In an advantageous embodiment, the PSA of the invention is resin-free and/or -disregarding the presence or absence of crosslinkers (see above)—free from other additives.

In order to fine-tune the pressure-sensitive adhesion properties, or as contributory components to a crosslinking or curing reaction, resins are frequently admixed to PSAs (tackifying resins, reactive resins). Conversely, the PSA of the invention may be realized outstandingly without the admixing of resins, without this having any deleterious effect on its suitability for the stated purpose. In this context, tackifying resins, thermoplastic resins, and reactive resins may be omitted. In particular, the absence of resins leads to a particularly residue-free substrate surface after demounting of the adhesive tape, as for example to particularly residue-free printing cylinders or printing sleeves, after the pressure-sensitive adhesive tape of the invention, previously bonded, has been removed again.

Resins are considered for the purposes of this specification to comprise, in particular, those oligomeric and (lower) polymeric compounds whose number-average molar mass $M_n$ is not more than 5000 g/mol. Of course, short-chain polymerization products which come about during the polymerization of the above-defined monomer mixture for preparing the polymer component of the PSA of the invention are not subsumed by the term "resins".

Tackifying resins—also referred to as tackifier resins—frequently have softening points in the range from 80 to 150° C., without any wish that this span should be imposed on the definition. The figures for the softening point $T_s$ of oligomeric and polymeric compounds, such as of the resins, relate to the ring & ball method of DIN EN 1427:2007 with appropriate application of the provisions (analysis of the oligomer sample or polymer sample instead of bitumen, with the procedure otherwise retained). The measurements are made in a glycerol bath. Those resins which can be omitted for the PSA of the invention are, for example, natural and/or synthetic resins, such as pinene resins and indene resins, rosin and derivatives of rosin (rosin esters, including rosin derivatives stabilized by disproportion or hydrogenation, for example), polyterpene resins, terpene-phenolic resins, alkylphenolic resins, aliphatic, aromatic, and aliphatic-aromatic hydrocarbon resins, to name but a few.

Reactive resins are those resins which have functional groups such that they would be able, given appropriate activation, to react with further constituents of the PSA—such as the macromolecules of the polymer components or other reactive resins, for example.

In so far as is desired, however, in an alternative procedure, tackifier resins and/or reactive resins may also be admixed to the adhesive of the invention.

In order to optimize the PSA of the invention, moreover, the additives familiar in each case to the skilled person for the particular purpose may be added. An advantage of the PSA of the invention, however, is that in particular even in additive-free form—leaving aside the crosslinkers which are discussed separately—it is outstandingly suitable for the intended application given. It is therefore possible to omit further additives—leaving aside the presence or absence of crosslinkers—without this having disadvantageous consequences for the advantageous properties of the PSA. Hence it is possible in particular to omit the admixing of additives such as plasticizers, filling materials, functional adjuvants for obtaining particular physical properties (such as electrically conductive filling materials, thermally conductive filling materials, and the like), flame retardants (such as ammonium polyphosphate and its derivatives, for example), and the like.

The adhesives of the invention are particularly suitable for detachable fastening of flexible printing plates because they can be used first of all to provide effective and reliable fixing of the printing plates and, secondly, detachment is readily possible, even if the printing plates have been cleaned with solvent which is contaminated by printing-ink residues.

Preparation Processes

A further aspect of the invention relates to a first process for producing a pressure-sensitive adhesive, where a first polymer component A is intimately mixed with at least one second polymer component B and optionally one or more further polymer components (C, D, . . . ), to give a polymer blend which makes up at least 60 wt % of the pressure-sensitive adhesive, where the first polymer component A is present at not less than x wt % in the polymer blend, where $90 \leq x \leq 99$, where the second polymer component B and any further polymer components C, D, . . . present are present in total at y wt % in the polymer blend, where y=100−x, where each polymer component (A, B, C, . . . ) derives to an extent of at least 60 wt % from (meth)acrylic monomers, and where none of the polymer components (A, B, C, . . . ) is homogeneously miscible at room temperature with any of the other polymer components (A, B, C, . . . ), and so a multi-phase system is formed.

A further process for preparing a pressure-sensitive adhesive is notable in that a first polymer component A is intimately mixed with at least one second polymer component B and optionally one or more further polymer components (C, D, . . . ), to give a polymer blend which makes up at least 60 wt % of the pressure-sensitive adhesive, where the first polymer component A is present at not less than x wt % in the polymer blend, where $90 \leq x \leq 99$, where the second polymer component B and any further polymer components C, D, . . . present are present in total at y wt % in the polymer blend, where y=100−x, where each polymer component (A, B, C, . . . ) derives to an extent of at least 60 wt % from (meth)acrylic monomers. With this process, each polymer component (A, B, C, . . . ) comprises polymers each obtained by polymerization of monomers, where the composition of the monomers for the polymers of each polymer component is selected such that the dissimilarity Z of the Hansen solubility parameters of each of the polymer components A, B, C, . . . with each of the other polymer components A, B, C . . . adopts a value of more than 1. With particular preference the implementation of this process leads to a pressure-sensitive adhesive for which none of the polymer components (A, B, C, . . . ) is homogeneously miscible at room temperature with any of the other polymer components (A, B, C, . . . ), and so a multi-phase system is formed.

The processes stated above are outstandingly utilizable to produce the PSA of the invention in its basic forms or in its advantageous embodiments, as identified in the context of this specification.

Use

A further subject of the invention is the use of a PSA of the invention—including each of its embodiments—or of a PSA prepared by a process of the invention, for the adhesive bonding of printing plates to surfaces, more particularly to curved surfaces.

The printing plate may advantageously be one composed of a polyethylene terephthalate film bearing at least one applied layer of a photopolymer.

The surface on which the printing plate is bonded consists, for example, of steel, polyurethane, or of a glass fibre-resin material.

The inventive use pertains in particular to the bonding of a printing plate to surfaces which are part of a printing cylinder or printing sleeve.

The PSA of the invention—including each of its embodiments—or a PSA prepared by a process of the invention is particularly suitable for use in printing processes employing cellulose nitrate-containing printing inks, and is especially suitable here, as set out above, for the bonding of printing plates to curved surfaces, such as to printing sleeves or printing cylinders, for example.

The PSA of the invention is suitable for reliable bonding on common materials and is notable for good residue-free redetachability. It exhibits this behaviour in particular even for very polar substrates, from which prior-art adhesives, especially after a prolonged period of bonding, can generally not be parted again without leaving residues.

Very good reversibility, i.e., residue-free redetachability, has been found even for substrates whose surface energy is 45 mN/m or more, in particular even for materials having surface energies in the region of 48 mN/m or more, such as steel, for example, which according to literature figures has the value of 50 mN/m.

The invention further provides the use of the PSA of the invention as a layer of adhesive for pressure-sensitive adhesive tapes, more particularly for double-sided pressure-sensitive adhesive tapes, and also the corresponding pressure-sensitive adhesive tapes comprising a layer of the PSA of the invention and the corresponding adhesive tapes as such. Such adhesive tapes may be equipped in particular with a carrier, optionally further layers and two outer layers of adhesive, which in turn may be provided temporarily—for more convenient handling, storage, and presentation—on one or both PSA layers with a temporary lining material, or liner. With such adhesive tapes equipped with pressure-sensitive adhesion on both sides, both layers of adhesive may be formed from the PSA of the invention—and may be identical in particular in their composition and/or thickness and/or state of crosslinking—or else one of the layers of adhesive may be realized by a PSA of the invention, while the other layer of adhesive is selected from a different PSA, which may be geared optimally to the substrate to be bonded accordingly. Suitable carrier materials for the pressure-sensitive adhesive tapes are the films customary and familiar to the skilled person, such as, for example, polyesters, polyethylene terephthalate (PET), polyethylene (PE), polypropylene (PP), biaxially oriented polypropylene (BOPP), monoaxially oriented polypropylene (MOPP), polyurethane (PU), polyvinyl chloride (PVC) and so on, it also being possible for these materials to be used in each case as a foamed layer. As carriers it is also possible to use composites of two or more layers—of a film layer and a foam layer, for example.

Attention is drawn to the fact that the PSA of the invention may also be used as a layer of adhesive on other adhesive tapes, examples being single-layer, carrier-less adhesive tapes ("adhesive transfer tapes"), which consist of the layer of adhesive.

As described, the PSA of the invention may be used outstandingly for bonding flexible printing plates to curved surfaces, particularly for bonding printing plates to printing cylinders or printing sleeves, more particularly as a layer of adhesive in a pressure-sensitive adhesive tape. The particular suitability of the PSA of the invention for reversible bonding to plastics (see above) makes it particularly suitable for bonding to printing plates made from that material. Since the adhesive also possesses good properties on other materials, the pressure-sensitive adhesive tapes in question may be used very flexibly, including in their use in flexographic printing. Thus the PSA of the invention may be employed as a layer of adhesive on double-sided pressure-sensitive adhesive tapes, with the PSA of the invention representing the layer of adhesive facing the printing plate during bonding. Use is made in particular of double-sided pressure-sensitive adhesive tapes of the kind described above. The carrier material used in this case is advantageously a foamed sheetlike structure—for example, a polymer foam layer. Hence it is possible in particular to use foamed polyolefins such as polyethylene and polypropylene; particular preference is given to a polyethylene/ethylene-vinyl acetate foam. Moreover, for example, foamed polyurethanes or foamed polyvinyl chlorides may be employed. Generally speaking, the carrier material may be roughened or otherwise pretreated to improve the anchoring of the PSA. One way of roughening and of chemically modifying the polymer structure involves wet-chemical etching of the carrier material. Besides etching, there are other possible pretreatments. Thus, for the purpose of improving the anchoring, the carrier materials may be pretreated physically and chemically. For the physical treatment, the film is treated preferably by flame or corona or plasma. For the chemical pretreatment, the carrier material is given an undercoat, and in one particularly preferred version, reactive undercoats are used. Suitable undercoat materials include, for example, reactive primers.

Figure 1B:
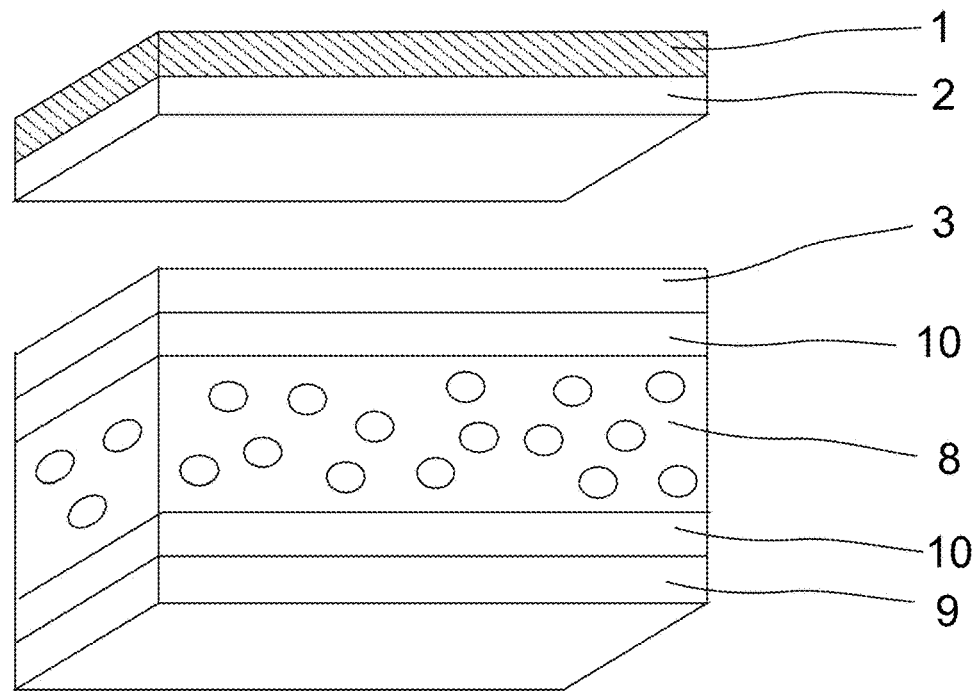

The construction of adhesive tapes of the invention corresponds in very preferred embodiments to a layer sequence as reproduced in FIGS. 1a and 1b. In that case the PSA of the invention is used with particular preference as layer 9 of adhesive, in other words the layer of adhesive facing the printing cylinder or printing sleeve in application, since the adhesive is optimized for this intended use.

By virtue of the broad utility spectrum of the PSA of the invention, it is also suitable for the adhesive layer which is in contact with the printing plate.

The adhesive tape of the invention serves advantageously to bond a printing plate which is composed of a PET film 2 and a layer of a photopolymer 1.

Layers 3 and 9 form the outer layers of adhesive of a double-sidedly adhesive plate-mounting tape of the invention, which by virtue of its carrier foam layer 8 is compressible and elastic. The PSA of the invention may be used either for layer 3, or for layer 9, or with particular advantage for both layers 3 and 9.

The reference numerals in FIGS. 1a and 1b have the following meanings:
  3 PSA for anchoring the plate
  4 the pretreated—more particularly etched or corona-treated—upper surface of the PET film 5
  5 film of polyethylene terephthalate (PET)
  6 the pretreated—more particularly etched or corona-treated—lower surface of the PET film 5
  7 adhesive—more particularly PSA—for anchoring the carrier foam layer 8 on the PET film 5
  8 carrier foam layer, e.g. polyethylene/ethylene-vinyl acetate foam
  9 PSA for anchoring on the printing cylinder
  10 polyethylene film of the carrier foam layer 8 (double-sided)

In the printing industry especially it is important that the adhesive tapes employed here have a high flexibility, i.e., are able to alter their thickness to a certain extent when pressure is applied, and to regain their original form when the load has been removed.

It is advantageous, furthermore, if the carrier foam layer 8 consists of polyolefin(s), polyvinyl chloride or polyurethane. One particularly preferred embodiment uses foamed polyethylenes and/or polypropylenes. It is further preferred if the surfaces of the carrier foam layer 8 have been physically pretreated, the physical pretreatment method being selected in particular from the group consisting of corona pretreatment, flame pretreatment, or plasma treatment.

It is advantageous if, alternatively or additionally, the surfaces of the PET film 5 and/or of the polyethylene films 10 are physically pretreated.

The physical pretreatment technique commonly referred to as "corona pretreatment" is usually a "dielectric barrier discharge" (DBD) wherein high-voltage discharges are generated by means of high-frequency alternating voltage. The substrate for treatment is passed in the form of a web between two high-voltage electrodes, with at least one electrode consisting of or having been coated with a dielectric material. The material for treatment is exposed directly to the electrical discharges, or at least to the reactive gas generated by the discharges. The electrical discharges are often referred to as "corona discharges".

Corona pretreatment as a method for the surface pretreatment of carriers is much in use industrially. Serving as a process gas, typically, is the ambient air. The use of process gases other than air, such as nitrogen, carbon dioxide, or noble gases, for example, is likewise known prior art.

Alternatively, the surface of the PSA layer 9 that faces the carrier may be physically pretreated, more particularly by corona pretreatment, flame pretreatment or plasma treatment, in order to improve the strength of the bond between the PSA layer and the carrier. Physical treatment of the PSA may likewise be carried out advantageously in air as process gas, although process gases used may also be, for example, nitrogen, carbon dioxide, or noble gases. Nitrogen or a mixture of air and nitrogen, for example, have been found to be advantageous.

For increasing the bond strength between the PSA layer 9 and the foamed carrier 8 it has emerged, surprisingly, as being particularly advantageous if not only the PSA layer 9 but also the foamed carrier 8 are pretreated physically on their sides respectively facing one another when assembled, or the corresponding surface of the lower PE film 10 and the PSA layer 9 are pretreated physically, prior to being brought together, more particularly by one of the aforementioned physical methods. In this case the pretreatment methods for the two layers may be selected independently of one another, but preferably they are pretreated by the same method, more preferably by means of corona pretreatment. By pretreatment of both layers, especially by corona pretreatment, the internal strength of the bond is significantly improved, and any residues of the adhesive tape—already a small quantity when using the PSA of the invention—remaining on demounting from its substrate (such as a printing cylinder or printing sleeve, for instance) may be perceptibly reduced even further.

In principle, then, it is surprising to the skilled person that through the treatment of a surface of adhesive by a physical method it is possible to achieve an increase in the bond strength. The skilled person expects all of these methods to be accompanied by chain breaks and a degradation of material, and so the expectation would be that a layer would be formed having a high level of polar groups, but a low internal cohesion. As a result of the weakly cohesive layer with increased polarity, improved wetting of the substrate by the adhesive is not surprising, but reduced adhesion properties will be expected.

The intensity of corona pretreatment is reported as the "dose" in [W*min/m$^2$], with the dose D=P/(b*v), where P=electrical power [W], b=electrode width [m], and v=belt speed [m/min].

Corona pretreatment takes place preferably at a dose of 1 to 150 W*min/m$^2$. Particularly preferred for the layer of PSA is a dose of 10 to 100 W*min/m$^2$, more particularly a dose of 40 to 60 W*min/m$^2$. For the foam carrier layer, higher doses are preferably used—for instance, here, a dose of 50 to 150 W*min/m$^2$, and more particularly a dose of 80 to 120 W*min/m$^2$, are very advantageous.

The film of polyethylene terephthalate (PET) preferably has a thickness of 5 μm to 500 μm, more preferably 5 μm to 60 μm; especially preferred are 12 μm, 19 μm and 23 μm.

Besides the product construction shown in FIG. 1a, the stabilizing film may also consist of polyolefins, polyurethanes, or polyvinyl chloride, and in addition to the etching it may also have been pretreated in a variety of ways. For instance, the stabilizing films here may also be pretreated physically and chemically in order to improve anchoring. For the physical treatment, the film is treated preferably by flame or corona or plasma. For the chemical pretreatment, the film is given an undercoat, with reactive undercoats being used in one particularly preferred embodiment. Examples of suitable undercoat materials include reactive primers. Furthermore, alternatively or additionally to the film layer, the adjacent layers of adhesive may also have been pretreated, corresponding in particular to the above-described layer 9 of adhesive.

In a further preferred version, the stabilizing film of polyethylene terephthalate or another material is printed on one or both sides. This printing may lie beneath a PSA for subsequent application.

For the PSAs 7 it is likewise possible, for example, to use an acrylate PSA, although in principle other types of adhesive can also be used.

Furthermore, the adhesive tape of the invention may be provided on one or both sides with a liner, more particularly a liner composed of an anti-adhesive material or anti-adhesively coated material. This liner may be, for example, paper or a corresponding film—in particular in each case single-sidedly or double-sidedly siliconized. This ensures longer storage and convenient handling during use.

The other adhesive tape designs as known from the prior art, particularly for the bonding of printing plates to printing cylinders or sleeves, may also be realized in accordance with the invention, however, with at least the layer of adhesive for bonding to the cylinder or sleeve, in particular, being realized through the PSA of the invention.

On account of its special properties, the double-sidedly adhesive tape of the invention may be used outstandingly for the fastening of printing plates, especially of photopolymer printing plates, and especially their multilayer forms, to printing cylinders and to printing sleeves.

By virtue of its special design, particularly with the bond strengths geared to the printing plate, the adhesive tape of the invention is outstandingly suitable for bonding the printing plates to the printing cylinders. On the one hand it is possible to reposition the printing plates before printing begins; on the other, however, firm bonding of the plate is ensured during the printing process. Even a printing plate soiled with ink residues can be removed from the pressure-sensitive adhesive tape without any damage at all. Peeling of the carrier layer of the plate, or the formation of unwanted creases in the plate during removal, do not occur. After the removal of the adhesive tape from the printing cylinder, no residues are left, either.

Figure 2:
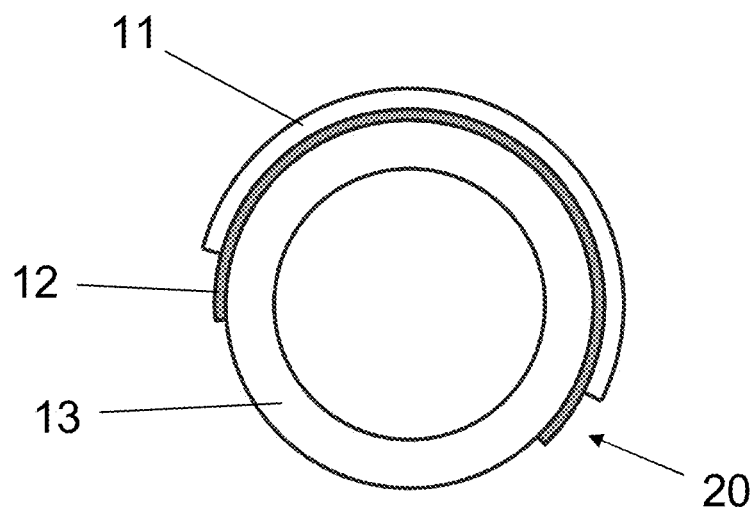
FIGS. 2-4 depict different ways of bonding printing plates to printing cylinders and printing sleeves.
Figure 3:
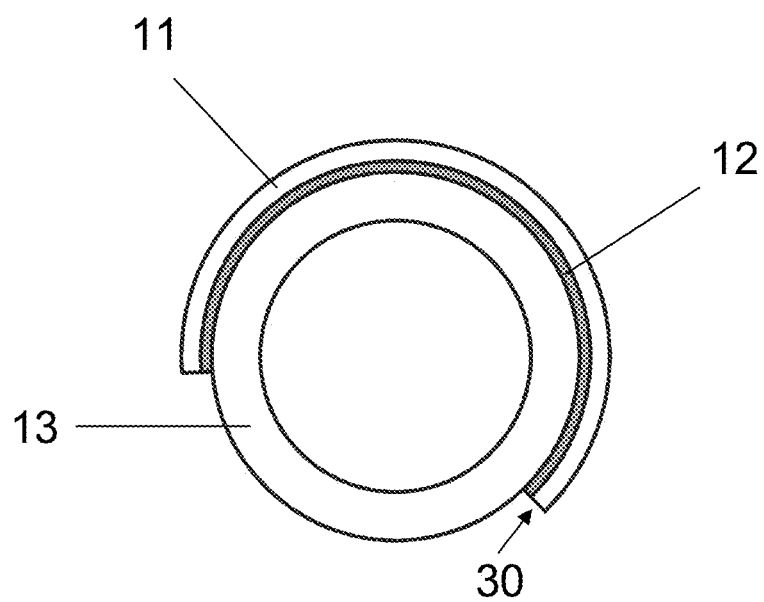

Printing plates are bonded to printing cylinders and printing sleeves in a variety of ways. Common methods are shown by FIGS. 2, 3 and 4:

According to FIG. 2, the plate (11) is bonded to the printing sleeve (13) or printing cylinder (13) by means of an adhesive tape (12) which is larger than the plate (11) and therefore projects by exposed regions (20) beneath the plate (11). According to the application variant in FIG. 3, the edges of the assembly of adhesive tape (12) and plate (11) finish flush with one another, edge (30).

Figure 4:
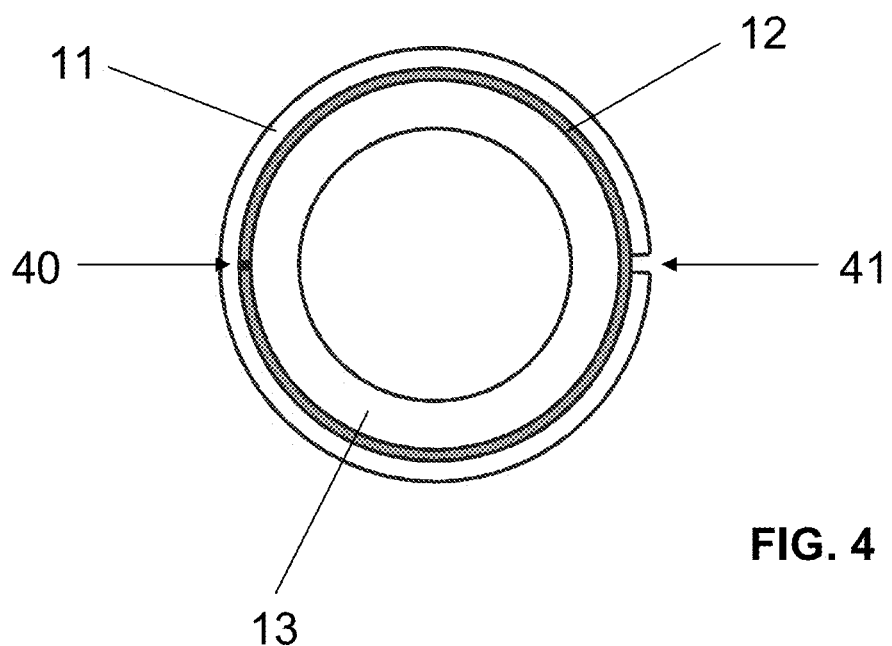

According to FIG. 4, the adhesive tape (12) for bonding the plate (11) surrounds the entire periphery of the printing cylinder (13) or printing sleeve (13), with the edges of the adhesive tape abutting one another, position (40). In order to prevent lifting of the assembly, the printing plate (11) is fixed on the adhesive tape in such a way that its edges (position 41) do not lie at the location of the adhesive tape butt joint (position 40).

These forms of application are shown here merely by way of example, without any intention that they should thereby restrict the teaching according to the invention.

The adhesive tapes of the invention exhibit very good mounting characteristics. Mounting characteristics in the sense of the present specification are understood in particular as the instantaneous adhesion during the bonding of an adhesive tape to a substrate, by means of the pressure-sensitive adhesive layer in question. For good mounting characteristics, therefore, brief applied pressure at low force ought, accordingly, to lead to effective and reliable adhering.

The PSAs of the invention meet the requirements for simple mounting, repositionability, secure hold even, in particular, on polar substrates and under the influence of solvent. Moreover, they are notable for simple and residue-free demountability. They are suitable in particular for application in flexographic printing, as set out above.

EXPERIMENTAL SECTION

Test Methods
Productin of a Pressure-Sensitively Bonded Assembly
A double-sidedly siliconized, grained liner material having a structured surface is coated from solution with a PSA from the examples. This produces the optimum transfer of the liner structure to the acrylate adhesive.

After drying at 120° C. for 15 minutes, the adhesive coat weight is 35 g/m². On the adhesive side, the coated liner material is laminated with a PET film 19 μm thick and etched on both sides with trichloroacetic acid. Subsequently, via a transfer carrier, a commercial acrylate adhesive with a coat weight of 20 g/m² or an adhesive with similar properties is laminated onto the uncoated side of the etched PET film in the assembly, and a PE-EVA foam with a thickness of 500 μm and a density of 250 kg/m³ is laminated on.

Laminated onto this foam carrier, via a transfer carrier, is a commercial acrylate PSA with a coweight of 60 g/m², lamination taking place to the uncoated side of the previous assembly (exposed pressure-sensitive adhesive acrylate layer).

Gel Permeation Chromatography GPC (method A):
The figures for the number-average and weight-average molecular weights $M_n$ and $M_w$ and also for the polydispersity PD in this specification are based on determination by gel permeation chromatography. The determination is made on 100 μL of sample having undergone clarifying filtration (sample concentration 4 g/L). The eluent used is tetrahydrofuran with 0.1 vol % of trifluoroacetic acid. Measurement takes place at 25° C. The pre-column used is a column of type PSS-SDV, 5 μm, $10^3$ Å, ID 8.0 mm×50 mm. Separation takes place using columns of type PSS-SDV, 5 μm, $10^3$ Å and also $10^5$ Å and $10^6$ Å each of ID 8.0 mm×300 mm (columns from Polymer Standards Service; detection using Shodex RI71 differential refractometer). The flow rate is 1.0 mL per minute. Calibration takes place against PMMA standards (polymethyl methacrylate calibration).

90° Peel Adhesion Test (Method B):
The peel adhesion to PET is determined under test conditions of 23° C.+/−1° C. temperature and 50%+/−5% relative humidity.

A strip of the adhesive tape specimen 20 mm wide is applied to a PET plate. This PET plate is cleaned twice with isopropanol beforehand and then left to stand in the air for 5 minutes to allow the solvent to evaporate.

The pressure-sensitive adhesive strip is pressed onto the substrate ten times using a steel pressing roller with a pressing pressure corresponding to a weight of 4 kg and with a rolling speed of 1000 mm/min. Immediately thereafter the adhesive tape is peeled from the substrate at a speed of 300 mm/min and at an angle of 90°. The results are reported in N/cm and are averaged from three measurements.

NC Test (Method C):
The peel adhesion to PET is determined under test conditions of 23° C.+/−1° C. temperature and 50%+/−5% relative humidity.

Two strips 20 mm wide of a PET film 50 μm thick are cleaned twice with ethanol and then left to stand in the air for 5 minutes to allow the solvent to evaporate.

A strip cleaned only with ethanol on both sides identifies the blank value. The PET strip is pressed onto the PSA ten times with a steel pressing roller at a pressing pressure corresponding to a weight of 4 kg with a rolling speed of 1000 mm/min.

The second strip (NC strip) after the two-fold cleaning is drawn through a nitrocellulose (NC) bath (solution of 0.1% NC in ethanol) and dried in suspension in the air for 20 minutes. The PET strip is then pressed onto the PSA ten times with a steel pressing roller at a pressing pressure corresponding to a weight of 4 kg with a rolling speed of 1000 mm/min.

Both specimens are stored at 40° C. for 72 hours, and then conditioned for one hour at 23° C.+/−1° C. temperature and 50%+/−5% relative humidity. The PET strips are peeled from the substrate at a rate of 300 mm/min and at an angle of 90° in order to determine the peel adhesion.

The maximum values of the force required are measured. The results are reported in N/cm and are averaged from three measurements. The value found for the peel adhesion of the NC strip is evaluated in relation to the value of the blank-value strip. The change (increase) in the peel adhesion is expressed as a percentage.

Advantageous in accordance with the invention is an increase in the peel adhesion of not more than 15%.

Figure 5:
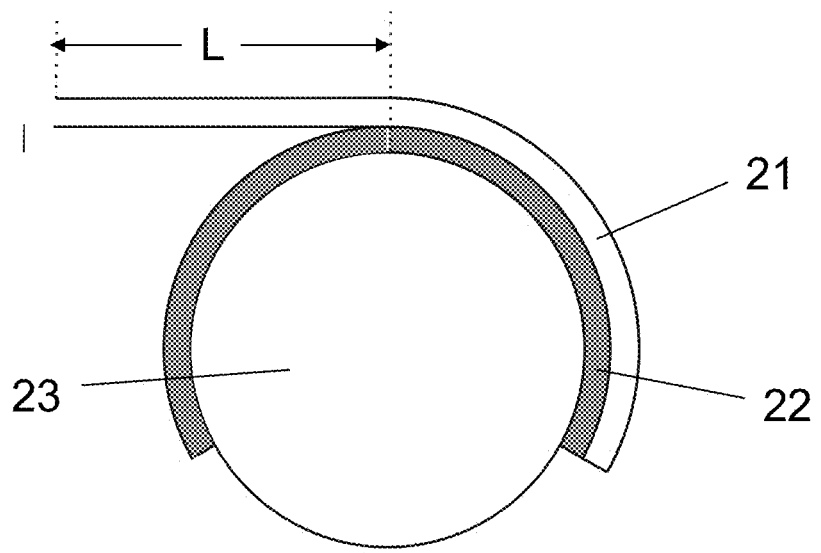
FIG. 5 depicts a test for measuring edge lifting.

Edge Lifting (Method D):
Compare in this respect FIG. 5
Without Nitrocellulose (NC)
The edge lifting is determined under test conditions of 23° C.+/−1° C. temperature and 50%+/−5% relative humidity.

A specimen measuring 250 mm×160 mm is cut from the double-sided adhesive assembly (22) under investigation.

This specimen is bonded, by the commercial, exposed pressure-sensitive adhesive acrylate layer, to a steel cylinder (23) having a diameter of 110 mm in such a way that the shorter edges of the specimens are aligned in the longitudinal direction of the cylinder. The liner material is then removed, leaving the layer of the PSA of the invention exposed. Atop the adhesive assembly specimens thus bonded, a full-area-exposed printing plate (21) from DuPont Cyrel HOS, with dimensions of 210 mm length×120 mm width×1.7 mm thickness, is adhered to the PSA of the invention in such a way that 20 mm of the underlying bonded assembly protrude at each edge (centred application to the bonded assembly specimen). The printing plate is aligned parallel to the upper edge of the bonded assembly. Beforehand, the PET side of the plate is cleaned with isopropanol and left to dry in the air for 5 minutes to allow the solvent to evaporate completely.

Subsequently the printing plate, starting from the upper plate edge, is rolled on using a rubber roller (width 100 mm, diameter 30 mm, Shore hardness A 45). The rolling movement is in the longitudinal direction of the printing cylinder and is performed continuously from one longitudinal edge of the plate to the opposite longitudinal edge of the plate and back again. The rolling speed is 10 m/min in the transverse direction. The printing cylinder rotates simultaneously with a surface velocity of 0.6 m/min, so that the rubber roller describes a zig zag movement relative to the printing plate, in the direction of the second transverse edge of the plate. Mounting of the plate to the bonded assembly took place with the corresponding pressing force needed in order to fix the plate over its full area and without edge lifting. The steel cylinder with the specimen thus bonded is stored in standing position for 72 hours under the stipulated climatic conditions (40° C.).

On the basis of its resilience, the plate tends towards edge lifting. Depending on the stability of the bond of the PSA of the invention on the plate, there is detachment of the plate edges which run in the longitudinal direction of the steel cylinder. To assess this behaviour, a determination is made of the length L of the lifted plate edge up to the first remaining point of contact with the substrate (determination of the maximum value of the lifting of each plate edge; average value from evaluation of both edges and three measuring operations in each case).

Edge lifting of no more than 5 mm is advantageous in accordance with the invention.

With Nitrocellulose (NC)

To assess the resistance of the adhesive to influences of the binders in printing inks, a 0.1% strength solution of cellulose nitrate in ethanol is prepared. The test is carried out using the low-viscosity "Walsroder® Nitrocellulose" A400, which has a nitrogen content of 10.7%—11.3% and a degree of substitution of 1.89-2.05.

The plate, with dimensions of 210 mm length×120 mm width×1.7 mm thickness, is cleaned with isopropanol and left lying in the air for 5 min to allow the solvent to evaporate completely. The plate is coated with 3 ml of the NC solution (0.1% NC and 99.9% ethanol) by means of a piece of cellulose with dimensions of 30 mm length×30 mm width×2 mm thickness. This is done in stripes, initially horizontal. Care should be taken to ensure that the plate has been wetted with the solution over its full area. The plate is coated a second time, this time vertically, with the same piece of cellulose.

The plate is then left to lie in the air for 1 minute to allow the solvent to evaporate. After that, in the same way as for a plate without NC, the printing plate is adhered, stored and evaluated.

Edge lifting of not more than 5 mm is advantageous in accordance with the invention.

Demounting (Method E)

Without Nitrocellulose (NC)

The edge lifting is determined under test conditions of 23° C.+/−1° C. temperature and 50%+/−5% relative humidity.

A specimen measuring 480 mm×340 mm is cut from the double-sided adhesive assembly under investigation. This specimen is bonded, by the exposed pressure-sensitive adhesive acrylate layer, to a steel cylinder having a diameter of 110 mm in such a way that the longer edges of the specimens are aligned in the longitudinal direction of the cylinder. The liner material is then removed, leaving the layer of the PSA of the invention exposed. Atop the adhesive assembly specimens thus bonded, a full-area-exposed printing plate from DuPont Cyrel HOS, with dimensions of 420 mm length×330 mm width×1.14 mm thickness, is adhered to the PSA of the invention in such a way that at each of the vertical plate edges 20 mm of the underlying pressure-sensitively bonded assembly protrude (centred application to the placed bonded assembly specimen). The printing plate is aligned such that the plate centre is placed over the gap in the double-sided bonded assembly.

Beforehand, the PET side of the plate is cleaned with isopropanol and left to dry in the air for 5 minutes to allow the solvent to evaporate completely.

Subsequently the printing plate, starting from the upper plate edge, is rolled on using a rubber roller (width 100 mm, diameter 30 mm, Shore hardness A 45). The rolling movement is in the longitudinal direction of the printing cylinder and is performed continuously from one longitudinal edge of the plate to the opposite longitudinal edge of the plate and back again. The rolling speed is 10 m/min in the transverse direction. The printing cylinder rotates simultaneously with a surface velocity of 0.6 m/min, so that the rubber roller describes a zig zag movement relative to the printing plate, in the direction of the second transverse edge of the plate. Mounting of the plate to the bonded assembly takes place with the corresponding pressing force needed in order to fix the plate over its full area and without edge lifting. The steel cylinder is stored with the specimen thus bonded, standing perpendicularly on one of its end faces, for 72 hours at 40° C.

With Nitrocellulose (NC)

A printing plate, with dimensions of 420 mm length×330 mm width×1.14 mm thickness, is cleaned on the PET side with isopropanol and left lying in the air for 5 min to allow the solvent to evaporate completely. The plate is coated with 5 ml of the NC solution (0.1% NC and 99.9% ethanol) by means of a piece of cellulose with dimensions of 30 mm length×30 mm width×4 mm thickness. This is done in stripes, initially horizontal. Care should be taken to ensure that the plate has been wetted with the solution over its full area. The plate is coated a second time, this time vertically, with the same piece of cellulose.

The plate is then left to lie in the air for 1 minute to allow the solvent to evaporate. The printing plate is then adhered analogously to a plate for evaluating the demounting and stored at 40° C. for 72 hours.

The force, to be applied subjectively, required for the demounting of the two printing plates is assessed. Demounting is carried out standing, with the feet at shoulder width from one another. The plate is grasped by both hands on an edge extending in the longitudinal direction of the steel cylinder, and is pulled off in the transverse direction to the steel cylinder (radially) at about 300 mm/min.

The division of the application of force is described by the evaluation scheme which is used in the sector.

Force expenditure marked with "+" is viewed by those in the art as being acceptable for application. Negative evaluations ("−") are considered to be no longer acceptable for everyday use.

Microshear Test (Method F)

This test serves for accelerated testing of the shear strength of adhesive tapes under temperature load.

Measurement Sample Preparation for Microshear Test:

An adhesive tape (length about 50 mm, width 10 mm) cut from the respective sample specimen is adhered to a steel test plate, which has been cleaned with acetone, in such a way that the steel plate protrudes to the right and left beyond the adhesive tape and that the adhesive tape protrudes beyond the test platen at the upper edge by 2 mm. The bond area of the sample in terms of height×width=13 mm×10 mm. The bond site is subsequently rolled down six times with a 2 kg steel roller at a speed of 10 m/min. The adhesive tape is reinforced flush with a stable adhesive strip which serves as a support for the travel sensor. The sample is suspended vertically by means of the test platen.

Microshear Test:

The sample specimen for measurement is loaded at the bottom end with a weight of 300 g. The test temperature is 40° C., the test duration 30 minutes (15 minutes of loading and 15 minutes of unloading). The shear travel after the predetermined test duration at constant temperature is reported as the result, in μm, as both the maximum value ["max"; maximum shear travel as a result of 15-minute loading]; and minimum value ["min"; shear travel ("residual deflection") 15 min after unloading; on unloading there is a movement back as a result of relaxation]. Likewise reported is the elastic component in percent ["elast"; elastic component=(max−min)·100/max].

EXAMPLES

Chemicals:
Crosslinker:
Al chelate: Al(III) acetylacetonate
From Sigma Aldrich
Nitrocellulose (NC): Walsroder® Nitrocellulose A400

Unless specifically indicated otherwise, all percentages below are percent by weight.

Quantity figures for the composition of the adhesive composed of polymer component I, and optional polymer component II, are based on 100 wt % of the overall adhesive composed of these components.

Quantity figures for the crosslinker are reported in parts by weight (pbw), based in each case on 100 parts by weight of all polyacrylate components.

Example 1

Preparation of Polyacrylate I (PA I)

A 300 L reactor conventional for radical polymerizations was charged with 2.0 kg of acrylic acid, 30.0 kg of isobornyl acrylate (BA), 68.0 kg of 2-ethylhexyl acrylate (EHA) and 72.4 kg of benzine/acetone (70:30). After nitrogen gas had been passed through the reactor for 45 minutes with stirring, the reactor was heated to 58° C. and 50 g of Vazo® 67 were added. The jacket temperature was then raised to 75° C. and the reaction was carried out constantly at this external temperature. After a reaction time of one hour, a further 50 g of Vazo® 67 were added. Dilution took place after 3 hours with 20 kg of benzine/acetone (70:30) and after 6 hours with 10.0 kg of benzine/acetone (70:30). For reduction of the residual initiators, 0.15 kg portions of Perkadox® 16 were added after 5.5 h and again after 7 h. After a reaction time of 24 h, the reaction was terminated and the batch was cooled to room temperature. Molar masses by GPC (measurement method A): $M_n$=62 800 g/mol; $M_w$=852 600 g/mol.

Hansen solubility parameters: $\delta_d$=17.1, $\delta_p$=6.5 and $\delta_H$=4.9

Example 2

Preparation of Polyacrylate II (PA II)

A conventional 2 L glass reactor suitable for radical polymerizations with evaporative cooling was charged with 300 g of a monomer mixture containing 219 g of ethylhexyl acrylate, 60 g of methyl acrylate and 21 g of acrylic acid, and 200 g of acetone:special-boiling-point (SBP) spirit 60/95 (1:1). After nitrogen gas had been passed through the reactor for 45 minutes, with stirring, the reactor was heated to 58° C. and 0.15 g of 2,2'-azodi(2-methylbutyronitrile) (Vazo 67®, from DuPont) in solution in 6 g of acetone was added. Thereafter the external heating bath was heated to 75° C. and the reaction was carried out constantly at this external temperature. After a reaction time of one hour, a further 0.15 g of VAZO 67® in solution in 6 g of acetone was added. After 3 hours, the batch was diluted with 90 g of SBP spirit 60/95.

After a reaction time of 5:30 hours, 0.45 g of bis-(4-tert-butylcyclohexanyl) peroxydicarbonate (Perkadox 16®, from Akzo Nobel) in solution in 9 g of acetone was added. After a reaction time of 7 hours a further 0.45 g of bis-(4-tert-butylcyclohexanyl) peroxydicarbonate (Perkadox 16®, from Akzo Nobel) in solution in 9 g of acetone was added. After a reaction time of 10 hours, the batch was diluted with 90 g of SBP spirit 60/95. After a reaction time of 24 hours, the reaction was discontinued and the batch was cooled to room temperature.

Molar masses by GPC (measurement method A): Mn=52 500 g/mol, $M_W$=626 000 g/mol.

Hansen solubility parameters: $\delta_d$=17.0 $\delta_p$=8.0 and $\delta_H$=6.5

Example 3

Preparation of Polyacrylate III (PA III)

A conventional 2 L glass reactor suitable for radical polymerizations with evaporative cooling was charged with 300 g of a monomer mixture containing 130.5 g of butyl acrylate, 130.5 g of ethylhexyl acrylate, 30 g of methyl acrylate and 15 g of acrylic acid, and 200 g of acetone:special-boiling-point (SBP) spirit 60/95 (1:1). After nitrogen gas had been passed through the reactor for 45 minutes, with stirring, the reactor was heated to 58° C. and 0.15 g of 2,2'-azodi(2-methylbutyronitrile) (Vazo 67®, from DuPont) in solution in 6 g of acetone was added. Thereafter the external heating bath was heated to 75° C. and the reaction was carried out constantly at this external temperature. After a reaction time of one hour, a further 0.15 g of VAZO 67® in solution in 6 g of acetone was added. After 3 hours, the batch was diluted with 90 g of SBP spirit 60/95.

After a reaction time of 5:30 hours, 0.45 g of bis-(4-tert-butylcyclohexanyl) peroxydicarbonate (Perkadox 16®, from Akzo Nobel) in solution in 9 g of acetone was added. After a reaction time of 7 hours a further 0.45 g of bis-(4- tert-butylcyclohexanyl) peroxydicarbonate (Perkadox 16®, from Akzo Nobel) in solution in 9 g of acetone was added. After a reaction time of 10 hours, the batch was diluted with 90 g of SBP spirit 60/95. After a reaction time of 24 hours, the reaction was discontinued and the batch was cooled to room temperature.

Molar masses by GPC (measurement method A): Mn=98 500 g/mol, $M_W$=1 515 000 g/mol.

Hansen solubility parameters: $\delta_d$=17.0 $\delta_p$=8.2 and $\delta_H$=6.4

Example 4

Preparation of Polyacrylate IV (PA IV)

A conventional 2 L glass reactor suitable for radical polymerizations with evaporative cooling was charged with 300 g of a monomer mixture containing 291 g of ethylhexyl acrylate, 9 g of acrylic acid, and 200 g of acetone:special-boiling-point (SBP) spirit 60/95 (1:1). After nitrogen gas had been passed through the reactor for 45 minutes, with stirring, the reactor was heated to 58° C. and 0.15 g of 2,2'-azodi(2-methylbutyronitrile) (Vazo 67®, from DuPont) in solution in 6 g of acetone was added. Thereafter the external heating bath was heated to 75° C. and the reaction was carried out constantly at this external temperature. After a reaction time of one hour, a further 0.15 g of VAZO 67® in solution in 6 g of acetone was added. After 3 hours, the batch was diluted with 90 g of SBP spirit 60/95.

After a reaction time of 5:30 hours, 0.45 g of bis-(4-tert-butylcyclohexanyl) peroxydicarbonate (Perkadox 16®, from Akzo Nobel) in solution in 9 g of acetone was added. After a reaction time of 7 hours a further 0.45 g of bis-(4-tert-butylcyclohexanyl) peroxydicarbonate (Perkadox 16®, from Akzo Nobel) in solution in 9 g of acetone was added. After a reaction time of 10 hours, the batch was diluted with 90 g of SBP spirit 60/95. After a reaction time of 24 hours, the reaction was discontinued and the batch was cooled to room temperature.

Molar masses by GPC (measurement method A): Mn=56 500 g/mol, $M_W$=1 037 000 g/mol.

Hansen solubility parameters: $\delta_d$=16.8 $\delta_p$=7.1 and $\delta_H$=5.2

Example 5

Preparation of Polyacrylate V (PA V)

A conventional 2 L glass reactor suitable for radical polymerizations with evaporative cooling was charged with 300 g of a monomer mixture containing 130.5 g of butyl acrylate, 130.5 g of ethylhexyl acrylate, 30 g of methyl acrylate and 15 g of acrylic acid, and 200 g of acetone: special-boiling-point (SBP) spirit 60/95 (30:70). After nitrogen gas had been passed through the reactor for 45 minutes, with stirring, the reactor was heated to 58° C. and 0.15 g of 2,2'-azodi(2-methylbutyronitrile) (Vazo 67®, from DuPont) in solution in 6 g of acetone was added. Thereafter the external heating bath was heated to 75° C. and the reaction was carried out constantly at this external temperature. After a reaction time of one hour, a further 0.15 g of VAZO 67® in solution in 6 g of acetone was added. After 3 hours, the batch was diluted with 90 g of SBP spirit 60/95.

After a reaction time of 5:30 hours, 0.45 g of bis-(4-tert-butylcyclohexanyl) peroxydicarbonate (Perkadox 16®, from Akzo Nobel) in solution in 9 g of acetone was added. After a reaction time of 7 hours a further 0.45 g of bis-(4-tert-butylcyclohexanyl) peroxydicarbonate (Perkadox 16®, from Akzo Nobel) in solution in 9 g of acetone was added. After a reaction time of 10 hours, the batch was diluted with 90 g of SBP spirit 60/95. After a reaction time of 24 hours, the reaction was discontinued and the batch was cooled to room temperature.

Molar masses by GPC (measurement method A): Mn=43 500 g/mol, $M_W$=730 000 g/mol.

Hansen solubility parameters: $\delta_d$=16.8 $\delta_p$=7.1 and $\delta_H$=5.1

Example 6

Preparation of Polyacrylate VI (PA VI)

A conventional 2 L glass reactor suitable for radical polymerizations with evaporative cooling was charged with 300 g of a monomer mixture containing 228 g of ethylhexyl acrylate, 60 g of stearyl acrylate and 12 g of acrylic acid, and 200 g of acetone:special-boiling-point (SBP) spirit 60/95 (1:1). After nitrogen gas had been passed through the reactor for 45 minutes, with stirring, the reactor was heated to 58° C. and 0.15 g of 2,2'-azodi(2-methylbutyronitrile) (Vazo 67®, from DuPont) in solution in 6 g of acetone was added. Thereafter the external heating bath was heated to 75° C. and the reaction was carried out constantly at this external temperature. After a reaction time of one hour, a further 0.15 g of VAZO 67® in solution in 6 g of acetone was added. After 3 hours, the batch was diluted with 90 g of SBP spirit 60/95.

After a reaction time of 5:30 hours, 0.45 g of bis-(4-tert-butylcyclohexanyl) peroxydicarbonate (Perkadox 16®, from Akzo Nobel) in solution in 9 g of acetone was added. After a reaction time of 7 hours a further 0.45 g of bis-(4-tert-butylcyclohexanyl) peroxydicarbonate (Perkadox 16®, from Akzo Nobel) in solution in 9 g of acetone was added. After a reaction time of 10 hours, the batch was diluted with 90 g of SBP spirit 60/95. After a reaction time of 24 hours, the reaction was discontinued and the batch was cooled to room temperature.

Molar masses by GPC (measurement method A): Mn=77 900 g/mol, $M_W$=1 334 000 g/mol.

Hansen solubility parameters: $\delta_d$=16.8 $\delta_p$=6.6 and $\delta_H$=4.8

Example 7

The PA I prepared analogously to Example 1 was admixed with a crosslinker solution (3 wt % in acetone) and was coated as described in "Production of a bonded assembly". The corresponding adhesive tape specimen was conditioned under standard conditions (23° C., 50% relative humidity) for a week.

The polymer component PA I was crosslinked with Al chelate (0.3 part by weight (pbw) per 100 pbw of polymer component 1).

Examples 8-27

The PA I (polymer component 1) prepared analogously to Example 1 was admixed with a second polymer component, with stirring. The polymer component 2 and the respective amounts can be found in Table 1. Subsequently the polymer mixture was admixed with a crosslinker solution (3 wt % in acetone) and was coated as described in "Production of a bonded assembly". The corresponding adhesive tape specimen was conditioned under standard conditions (23° C., 50% relative humidity) for a week. The polymer mixture was crosslinked with Al chelate (0.3 pbw per 100 pbw of polymer component 1+polymer component 2).

TABLE 1

| Example | Polymer component 1 | Fraction of polymer component 1 [wt %] | Polymer component 2 | Fraction of polymer component 2 [wt %] | PBW of crosslinker (Al chelate) |
|---|---|---|---|---|---|
| 8 | PA I (Ex. 1) | 98 | PA II (Ex. 2) | 2 | 0.3 |
| 9 | PA I (Ex. 1) | 95 | PA II (Ex. 2) | 5 | 0.3 |
| 10 | PA I (Ex. 1) | 90 | PA II (Ex. 2) | 10 | 0.3 |
| 11 | PA I (Ex. 1) | 85 | PA II (Ex. 2) | 15 | 0.3 |
| 12 | PA I (Ex. 1) | 98 | PA III (Ex. 3) | 2 | 0.3 |
| 13 | PA I (Ex. 1) | 95 | PA III (Ex. 3) | 5 | 0.3 |
| 14 | PA I (Ex. 1) | 90 | PA III (Ex. 3) | 10 | 0.3 |
| 15 | PA I (Ex. 1) | 85 | PA III (Ex. 3) | 15 | 0.3 |
| 16 | PA I (Ex. 1) | 98 | PA IV (Ex. 4) | 2 | 0.3 |
| 17 | PA I (Ex. 1) | 95 | PA IV (Ex. 4) | 5 | 0.3 |
| 18 | PA I (Ex. 1) | 90 | PA IV (Ex. 4) | 10 | 0.3 |
| 19 | PA I (Ex. 1) | 85 | PA IV (Ex. 4) | 15 | 0.3 |
| 20 | PA I (Ex. 1) | 98 | PA V (Ex. 5) | 2 | 0.3 |
| 21 | PA I (Ex. 1) | 95 | PA V (Ex. 5) | 5 | 0.3 |
| 22 | PA I (Ex. 1) | 90 | PA V (Ex. 5) | 10 | 0.3 |
| 23 | PA I (Ex. 1) | 85 | PA V (Ex. 5) | 15 | 0.3 |
| 24 | PA I (Ex. 1) | 98 | PA VI (Ex. 6) | 2 | 0.3 |
| 25 | PA I (Ex. 1) | 95 | PA VI (Ex. 6) | 5 | 0.3 |
| 26 | PA I (Ex. 1) | 90 | PA VI (Ex. 6) | 10 | 0.3 |
| 27 | PA I (Ex. 1) | 85 | PA VI (Ex. 6) | 15 | 0.3 |

Results

Inventive examples: 8-10, 12-14, 16-18

Counter-examples (do not meet the requirements stated in accordance with the invention):

7, 11, 15, 19-27.

The results of the investigations are reproduced in Table 2.

All inventive adhesives, moreover, have a crosslinking status which according to method F corresponds to a microshear travel of between 125 μm and 250 μm.

In the known prior art, polyacrylate PSAs consist of only one polymer component. As Example 7 shows, it is possible with a polyacrylate to achieve in principle a PSA exhibiting good peel adhesion on PET (method F) and advantageous edge lifting (method D) with good demounting (method E, without cellulose nitrate [identified in abbreviated form as NC]). Significant weaknesses occur with such a PSA, however, when the corresponding adhesive tapes are used in printing operations with cellulose nitrate-containing printing inks. Example 7 shows an increase in the peel adhesion due to NC of 51.3% (method C), and at the same time non-advantageous demounting characteristics.

Unpredictably, the object stated according to the invention is achieved by means of an adhesive which contains at least two polymer components.

Through investigations by Differential Scanning Calorimetry (DSC) and/or, where more advantageous for the particular sample, by electron scanning, it was found that all inventive PSAs were phase-separated, whereas all of the adhesives with a dissimilarity Z of less than 1 (examples 20 to 27) were not.

The polymer components are preferably selected such that the dissimilarity Z of the polymer components takes on a value of at least 1.

From the results for examples 20-27 it is apparent that a PSA consisting of two polymer components having a dissimilarity Z of less than 1 is unable to achieve the stated object. With the examples stated, an increase in the peel adhesion due to cellulose nitrate (NC) of at least 20% can be found (method C). This unadvantageous quality is also reflected in a disadvantageous demounting (method E).

Surprisingly for the skilled person, PSAs consisting of two polymer components with a dissimilarity Z of greater than 1 do not exhibit disadvantageous behaviour on contact with NC in the context of technical adhesive investigations. Examples 8-19 demonstrate this, showing a peel adhesion increase due to NC (method C) of only 14.6% at most. In the application test for demounting (method E), moreover, only advantageous results can be ascertained. In comparison to the results from example 7, moreover, the peel adhesion to PET by method B is unaffected. Conversely, for examples 8-19, a non-advantageous trend in the edge lifting can be discerned by method D. Unacceptable edge lifting of >5 mm occurs at a fraction of 15 wt % of the second polymer component. Examples 11, 15 and 19 exhibit these results, although even these exhibit phase separation (DSC or electron microscopy).

Deserving of emphasis as advantageous in accordance with the invention, therefore, are examples 8-10, 12-14 and 16-18, in relation to advantageous edge lifting of not more than 5 mm (method E), easy demounting by method D, and an advantageously small increase in the peel adhesion due to NC (method C).

TABLE 2

| | | | | | Peel adhesion PET [N/cm] (Method B) | MST (Method F) | | | NC Test (Method C) | | Application test | |
| | | | | | | | | | Peel adhesion PET strip [N/cm] | Increase in peel adhesion due to NC [%] | Edge lifting | Demounting |
| Example | Component 1 | Wt % | Component 2 | Wt % | Z | | max [μm] | elast | Plate | | | (Method D) | (Method E) |
|---|---|---|---|---|---|---|---|---|---|---|---|---|---|
| 7 | PA I | 100 | / | / | / | 6.0 | 79 | 80 | no NC | 3.9 | 51.3 | no NC | 1 | + |
| | | | | | | | | | with NC | 5.9 | | with NC | 0 | − |
| 8 | PA I | 98 | PA II | 2 | 3.21 | 5.9 | 73 | 72 | no NC | 3.5 | 8.6 | no NC | 1 | + |
| | | | | | | | | | with NC | 3.8 | | with NC | 1 | + |
| 9 | PA I | 95 | PA II | 5 | 3.21 | 6.1 | 71 | 73 | no NC | 3.3 | 9.1 | no NC | 1 | + |
| | | | | | | | | | with NC | 3.6 | | with NC | 1 | + |
| 10 | PA I | 90 | PA II | 10 | 3.21 | 5.7 | 75 | 81 | no NC | 3.6 | 5.6 | no NC | 3 | + |
| | | | | | | | | | with NC | 3.8 | | with NC | 2 | + |
| 11 | PA I | 85 | PA II | 15 | 3.21 | 5.7 | 78 | 80 | no NC | 4.0 | 5.0 | no NC | 7 | + |
| | | | | | | | | | with NC | 4.2 | | with NC | 6 | + |
| 12 | PA I | 98 | PA III | 2 | 3.42 | 6.2 | 76 | 73 | no NC | 3.5 | 5.7 | no NC | 1 | + |
| | | | | | | | | | with NC | 3.7 | | with NC | 1 | + |
| 13 | PA I | 95 | PA III | 5 | 3.42 | 6 | 70 | 70 | no NC | 3.3 | 3.0 | no NC | 1 | + |
| | | | | | | | | | with NC | 3.4 | | with NC | 1 | + |

TABLE 2-continued

| Example | Component 1 | Wt % | Component 2 | Wt % | Z | Peel adhesion PET [N/cm] (Method B) | MST (Method F) max [μm] | elast | NC Test (Method C) PET strip | Peel adhesion [N/cm] | Increase in peel adhesion due to NC [%] | Application test Plate | Edge lifting (Method D) | De-mounting (Method E) |
|---|---|---|---|---|---|---|---|---|---|---|---|---|---|---|
| 14 | PA I | 90 | PA III | 10 | 3.42 | 5.8 | 71 | 76 | no NC | 3.5 | 0.0 | no NC | 3 | + |
|   |   |   |   |   |   |   |   |   | with NC | 3.5 |   | with NC | 3 | + |
| 15 | PA I | 85 | PA III | 15 | 3.42 | 5.9 | 74 | 83 | no NC | 3.3 | 6.1 | no NC | 9 | + |
|   |   |   |   |   |   |   |   |   | with NC | 3.5 |   | with NC | 7 | + |
| 16 | PA I | 98 | PA IV | 2 | 1.14 | 5.6 | 74 | 83 | no NC | 4.1 | 14.6 | no NC | 1 | + |
|   |   |   |   |   |   |   |   |   | with NC | 4.7 |   | with NC | 0 | + |
| 17 | PA I | 95 | PA IV | 5 | 1.14 | 5.8 | 66 | 84 | no NC | 3.7 | 13.5 | no NC | 1 | + |
|   |   |   |   |   |   |   |   |   | with NC | 4.2 |   | with NC | 1 | + |
| 18 | PA I | 90 | PA IV | 10 | 1.14 | 5.9 | 77 | 84 | no NC | 4 | 10.0 | no NC | 5 | + |
|   |   |   |   |   |   |   |   |   | with NC | 4.4 |   | with NC | 5 | + |
| 19 | PA I | 85 | PA IV | 15 | 1.14 | 6.3 | 77 | 84 | no NC | 3.8 | 10.5 | no NC | 7 | + |
|   |   |   |   |   |   |   |   |   | with NC | 4.2 |   | with NC | 6 | + |
| 20 | PA I | 98 | PA V | 2 | 0.98 | 5.6 | 65 | 73 | no NC | 3.8 | 26.3 | no NC | 1 | + |
|   |   |   |   |   |   |   |   |   | with NC | 4.8 |   | with NC | 0 | − |
| 21 | PA I | 95 | PA V | 5 | 0.98 | 6.3 | 70 | 71 | no NC | 3.8 | 21.1 | no NC | 1 | + |
|   |   |   |   |   |   |   |   |   | with NC | 4.6 |   | with NC | 1 | − |
| 22 | PA I | 90 | PA V | 10 | 0.98 | 6.2 | 71 | 78 | no NC | 3.7 | 24.3 | no NC | 5 | + |
|   |   |   |   |   |   |   |   |   | with NC | 4.6 |   | with NC | 0 | − |
| 23 | PA I | 85 | PA V | 15 | 0.98 | 5.9 | 79 | 80 | no NC | 3.5 | 20.0 | no NC | 8 | + |
|   |   |   |   |   |   |   |   |   | with NC | 4.2 |   | with NC | 1 | − |
| 24 | PA I | 98 | PA VI | 2 | 0.44 | 6.2 | 71 | 80 | no NC | 4.1 | 43.9 | no NC | 1 | + |
|   |   |   |   |   |   |   |   |   | with NC | 5.9 |   | with NC | 1 | − |
| 25 | PA I | 95 | PA VI | 5 | 0.44 | 6.0 | 67 | 73 | no NC | 4.4 | 40.9 | no NC | 1 | + |
|   |   |   |   |   |   |   |   |   | with NC | 6.2 |   | with NC | 0 | − |
| 26 | PA I | 90 | PA VI | 10 | 0.44 | 5.6 | 79 | 84 | no NC | 3.9 | 48.7 | no NC | 4 | + |
|   |   |   |   |   |   |   |   |   | with NC | 5.8 |   | with NC | 1 | − |
| 27 | PA I | 85 | PA VI | 15 | 0.44 | 5.9 | 77 | 73 | no NC | 3.5 | 57.1 | no NC | 7 | + |
|   |   |   |   |   |   |   |   |   | with NC | 5.5 |   | with NC | 1 | − |

TABLE 3

| CAS | Monomer | HSP (Stefanis-Panayiotou) $\delta_D$ | $\delta_P$ | $\delta_H$ |
|---|---|---|---|---|
| 79-10-7 | Acrylic acid | 17.7 | 8.6 | 11.1 |
| 141-32-2 | n-Butyl acrylate | 17.1 | 8.6 | 6.5 |
| 28343-58- | Heptadecyl acrylate | 15.0 | 1.6 | 2.5 |
| 689-12-3 | Isobutyl acrylate | 16.9 | 8.2 | 6.6 |
| 12542-30- | Dihydrodicyclopentadienyl acrylate | 20.2 | 4.6 | 4.0 |
| 140-88-5 | Ethyl acrylate | 17.1 | 9.2 | 7.3 |
| 7328-17-8 | Ethylene diglycol acrylate | 17.2 | 10.4 | 6.2 |
| 103-11-7 | 2-Ethyhexyl acrylate | 16.7 | 7.0 | 4.7 |
| 2499-95-8 | Hexyl acrylate | 17.0 | 7.9 | 5.7 |
| 818-61-1 | Hydroxyethyl acrylate | 17.8 | 12.0 | 15.3 |
| 5888-33-5 | Isobornyl acrylate | 17.6 | 6.1 | 4.1 |
| 29590-42- | Isooctyl acrylate | 16.8 | 7.0 | 5.0 |
| 2156-97-0 | Lauryl acrylate | 16.9 | 2.5 | 0.8 |
| 96-33-3 | Methyl acrylate | 17.2 | 9.5 | 7.7 |
| 3121-61-7 | Methoxyethyl acrylate | 17.5 | 10.7 | 7.8 |
| 925-60-0 | Propyl acrylate | 17.1 | 8.9 | 6.9 |
| 149021-4813-57-4 | Propylheptyl acrylate | 16.7 | 6.4 | 3.9 |
| 4813-57-4 | Stearyl acrylate | 16.7 | 1.7 | 0.1 |
| 1663-39-4 | tert-Butyl acrylate | 16.4 | 9.5 | 6.0 |
| 97-88-1 | n-Butyl methacrylate | 16.7 | 8.4 | 6.0 |
| 6140-75-6 | Heptadecyl methacrylate | 14.6 | 2.3 | 2.8 |
| 101-43-9 | Cyclohexyl methacrylate | 17.9 | 6.4 | 5.8 |
| 688-84-6 | 2-Ethylhexyl methacrylate | 16.4 | 6.8 | 4.2 |
| 97-63-2 | Ethyl methacrylate | 16.8 | 9.0 | 6.8 |
| 00106-91- | Glycidyl methacrylate | 18.6 | 12.0 | 7.6 |
| 868-77-9 | Hydroxyethyl methacrylate | 17.4 | 11.5 | 14.4 |
| 97-86-9 | Isobutyl methacrylate | 16.5 | 8.0 | 6.2 |
| 7534-94-3 | Isobornyl methacrylate | 17.3 | 5.9 | 3.6 |
| 142-90-5 | Lauryl methacrylate | 16.5 | 3.3 | 1.0 |
| 80-62-6 | Methyl methacrylate | 16.8 | 9.3 | 7.2 |
| 32360-05- | Stearyl methacrylate | 16.4 | 2.5 | 0.3 |
| 84100-23- | tert-Butylcyclohexyl methacrylate | 15.6 | 3.6 | 3.3 |
| 585-07-9 | tert-Butyl methacrylate | 16.1 | 9.3 | 5.5 |
| 98-83-9 | alpha-Methylstyrene | 18.6 | 3.4 | 2.5 |
| 107-13-1 | Acrylonitrile | 18.0 | 14.2 | 6.7 |
| 107-58-4 | N-tert-Butylacrylamide | 14.6 | 11.3 | 5.9 |
| 2235-00-9 | N-Vinylcaprolactam | 20.2 | 10.8 | 6.4 |
| 88-12-0 | N-Vinylpyrrolidone | 20.2 | 11.5 | 7.2 |
| 100-42-5 | Styrene | 18.9 | 2.6 | 2.2 |
| 108-05-4 | Vinyl acetate | 16.7 | 9.5 | 8.0 |
| 79-06-1 | Acrylamide | 16.2 | 11.4 | 11.9 |

The invention claimed is:

1. A method of bonding a printing plate to a curved surface, said method comprising bonding the printing plate to the curved surface using a pressure-sensitive adhesive, wherein said pressure-sensitive adhesive comprises at least 60 wt % of a blend of polymers ("polymer blend"), where the polymer blend consists of a first polymer component A, a second polymer component B, and optionally one or more further polymer components, where the first polymer component A is present at not less than x wt % in the polymer blend, where 90≤x≤98, and where the second polymer component B and any further polymer components present are present in total at y wt % in the polymer blend, where y=100−x, where each polymer component derives to an extent of at least 80 wt % from (meth)acrylic monomers, where each polymer component has a weight average molecular weight $M_w$ in the range from 250,000 g/mol to 10,000,000 g/mol, wherein none of the polymer components is homogeneously miscible at room temperature with any of the other polymer components and so a multi-phase system is present; and wherein the first polymer component A, the second polymer component B, and the optional one or more further polymer components are selected such that the dissimilarity Z of the Hansen solubility parameters of each of the polymer components with each of the other polymer components adopts a value of more than 1.

2. Method according to claim 1, wherein the printing plate is one composed of a polyethylene terephthalate film bearing at least one applied layer of a photopolymer.

3. Method according to claim 1, wherein the surface to which the printing plate is bonded consists of steel, polyurethane or of a glass fibre-resin material.

4. Method according to claim 1, wherein the surface to which the printing plate is bonded is part of a printing cylinder or printing sleeve.

5. Method according to claim 1, which is conducted in a printing process using a printing ink comprising cellulose nitrate.

6. Method according to claim 1, wherein the polymer blend makes up at least 99.9 wt % of the pressure-sensitive adhesive.

7. Method according to claim 1, wherein the first polymer component A consists of a single polymer.

8. Method according to claim 1, wherein the polymer component A is a homogeneous mixture of two or more polymers.

9. Method according to claim 1, wherein the polymer blend is formed exclusively of polymer components A and B, and so a two-phase system is present.

10. Method according to claim 1, wherein the polymer component B consists of a single polymer.

11. Method according to claim 1, wherein the polymer component B is a homogeneous mixture of two or more polymers.

* * * * *